United States Patent
Kamiya et al.

(10) Patent No.: US 9,876,668 B2
(45) Date of Patent: Jan. 23, 2018

(54) COMMUNICATION APPARATUS, DEMODULATION APPARATUS, CARRIER REPRODUCTION APPARATUS, PHASE ERROR COMPENSATION APPARATUS, PHASE ERROR COMPENSATION METHOD, AND STORAGE MEDIUM ON WHICH PHASE ERROR COMPENSATION PROGRAM HAS BEEN STORED

(71) Applicant: NEC Corporation, Tokyo (JP)

(72) Inventors: Norifumi Kamiya, Tokyo (JP); Eisaku Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/110,451

(22) PCT Filed: Jan. 15, 2015

(86) PCT No.: PCT/JP2015/000160
§ 371 (c)(1),
(2) Date: Jul. 8, 2016

(87) PCT Pub. No.: WO2015/107897
PCT Pub. Date: Jul. 23, 2015

(65) Prior Publication Data
US 2016/0330064 A1  Nov. 10, 2016

(30) Foreign Application Priority Data
Jan. 16, 2014  (JP) .................................. 2014-006180

(51) Int. Cl.
*H04L 27/38*  (2006.01)
*H04L 27/00*  (2006.01)

(52) U.S. Cl.
CPC ...... *H04L 27/3872* (2013.01); *H04L 27/0014* (2013.01); *H04L 2027/0067* (2013.01)

(58) Field of Classification Search
CPC ............. H04L 27/0014; H04L 27/3872; H04L 2027/0067
See application file for complete search history.

(56) References Cited

U.S. PATENT DOCUMENTS

| 5,644,606 A | 7/1997 | Martinez et al. |
| 6,160,443 A | 12/2000 | Maalej et al. |
(Continued)

FOREIGN PATENT DOCUMENTS

| EP | 1115237 A1 | 7/2001 |
| EP | 2498466 A1 | 9/2012 |
(Continued)

OTHER PUBLICATIONS

International Search Report corresponding to PCT/JP2015/000160, dated Mar. 17, 2015, 2 pages.
(Continued)

*Primary Examiner* — Syed Haider
(74) *Attorney, Agent, or Firm* — Wilmer Culter Pickering Hale & Dorr

(57) ABSTRACT

To enable a large-capacity, high-quality data communication that is excellent in bit error rate characteristic even in an adverse noise environment mainly caused by phase noises or thermal noises. [Solution] Included are: a first phase error detection filter that generates, on the basis of a forward sequence of received symbols, a first phase difference value and a first phase error estimated value; a second phase error detection filter that generates, on the basis of a backward sequence of received symbols, a second phase difference value and a second phase error estimated value; a phase error combination means that generates a third phase error estimated value on the basis of the first and second phase error estimated values and one of the first and second phase difference values; and a phase error compensation means
(Continued)

that compensates the phase error of the received symbols in accordance with the third phase error estimated value.

7 Claims, 20 Drawing Sheets

(56) References Cited

U.S. PATENT DOCUMENTS

| | | | | |
|---|---|---|---|---|
| 6,205,086 | B1* | 3/2001 | Hanzawa | G11C 7/1051 |
| | | | | 327/153 |
| 7,529,321 | B1 | 5/2009 | Shiraishi et al. | |
| 8,938,037 | B1* | 1/2015 | Fard | H04L 1/0036 |
| | | | | 375/229 |
| 2001/0026584 | A1 | 10/2001 | Sommer et al. | |
| 2003/0189994 | A1 | 10/2003 | Sommer et al. | |
| 2004/0047410 | A1* | 3/2004 | Choi | H04L 27/0014 |
| | | | | 375/232 |
| 2004/0161047 | A1* | 8/2004 | Liu | H04L 27/2657 |
| | | | | 375/260 |
| 2006/0078070 | A1* | 4/2006 | Zhidkov | H04L 7/0029 |
| | | | | 375/326 |
| 2007/0192048 | A1* | 8/2007 | Hu | H04L 27/0014 |
| | | | | 702/69 |
| 2008/0101508 | A1* | 5/2008 | Oh | H04L 27/0014 |
| | | | | 375/344 |
| 2008/0267336 | A1 | 10/2008 | Okamoto | |
| 2012/0224657 | A1 | 9/2012 | Sasaki et al. | |
| 2015/0085960 | A1* | 3/2015 | Kamiya | H04L 27/3836 |
| | | | | 375/346 |

FOREIGN PATENT DOCUMENTS

| | | |
|---|---|---|
| JP | H08-107434 A | 4/1996 |
| JP | H10-107861 A | 4/1998 |
| JP | 2000-101666 A | 4/2000 |
| JP | 2003-531523 A | 10/2003 |
| JP | 2008-278174 A | 11/2008 |
| JP | 2011-101177 A | 5/2011 |
| WO | WO-01/0080511 A1 | 10/2001 |
| WO | WO-2011/068119 A1 | 6/2011 |

OTHER PUBLICATIONS

Written Opinion of PCT/JP2015/000160, dated Mar. 17, 2015, 4 pages (English translation).

J. Yang, B. Geller, "Near Optimal Low Complexity Smoothing Loops for Dynamical Phase Estimation-Application to BPSK Modulated Signal," IEEE Transactions on Signal Processing, vol. 57, No. 9, Sep. 1, 2009, pp. 3704-3711.

J. Yang, B. Geller, C. Herzet, J. M. Brossier, "Smoothing PLLs for QAM Dynamical Phase Estimation," IEEE ICC 2009 Proceedings, 2009, pp. 1-5.

Extended European Search Report issued by the European Patent Office for European Application No. 15737729.2 dated Jul. 25, 2017 (8 pages).

* cited by examiner

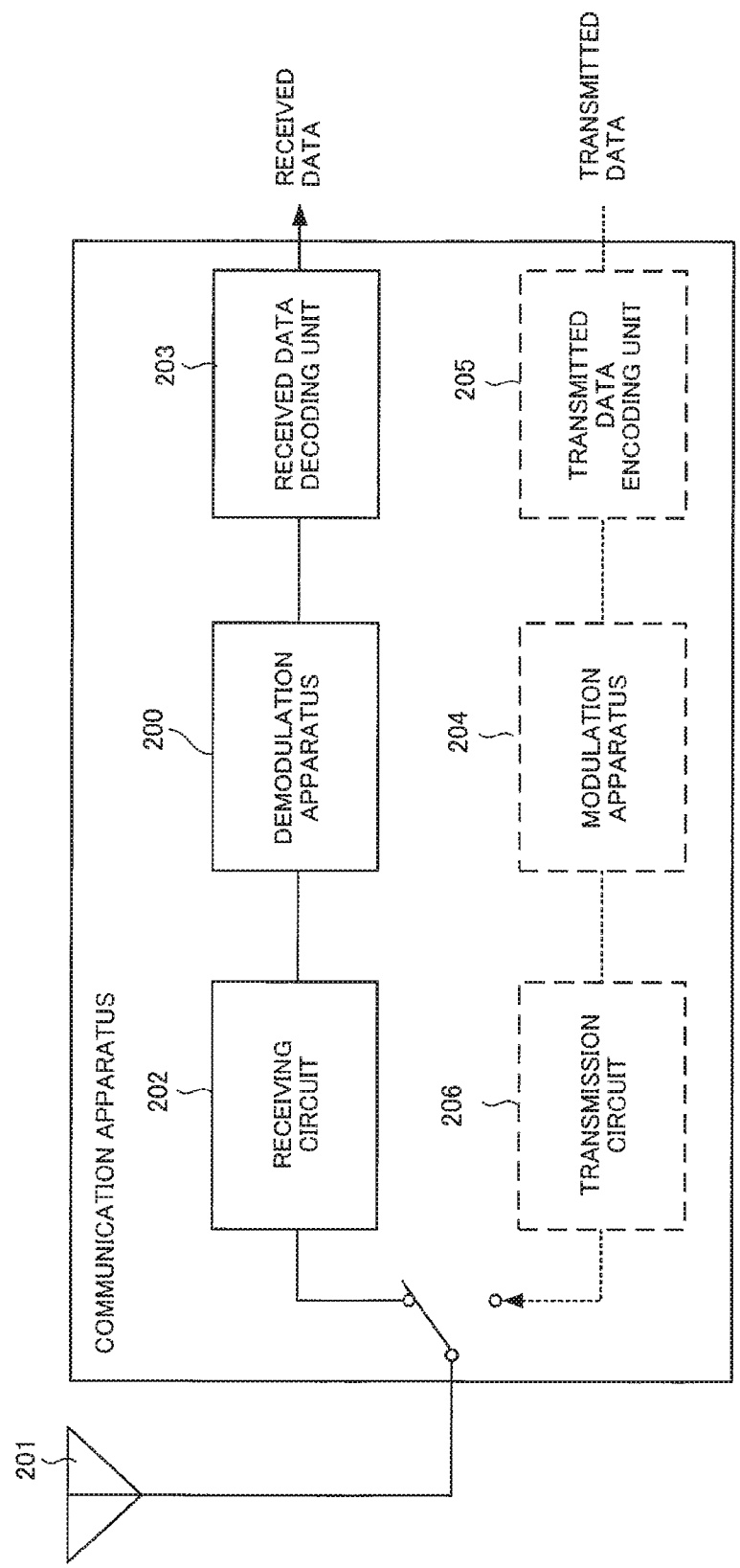

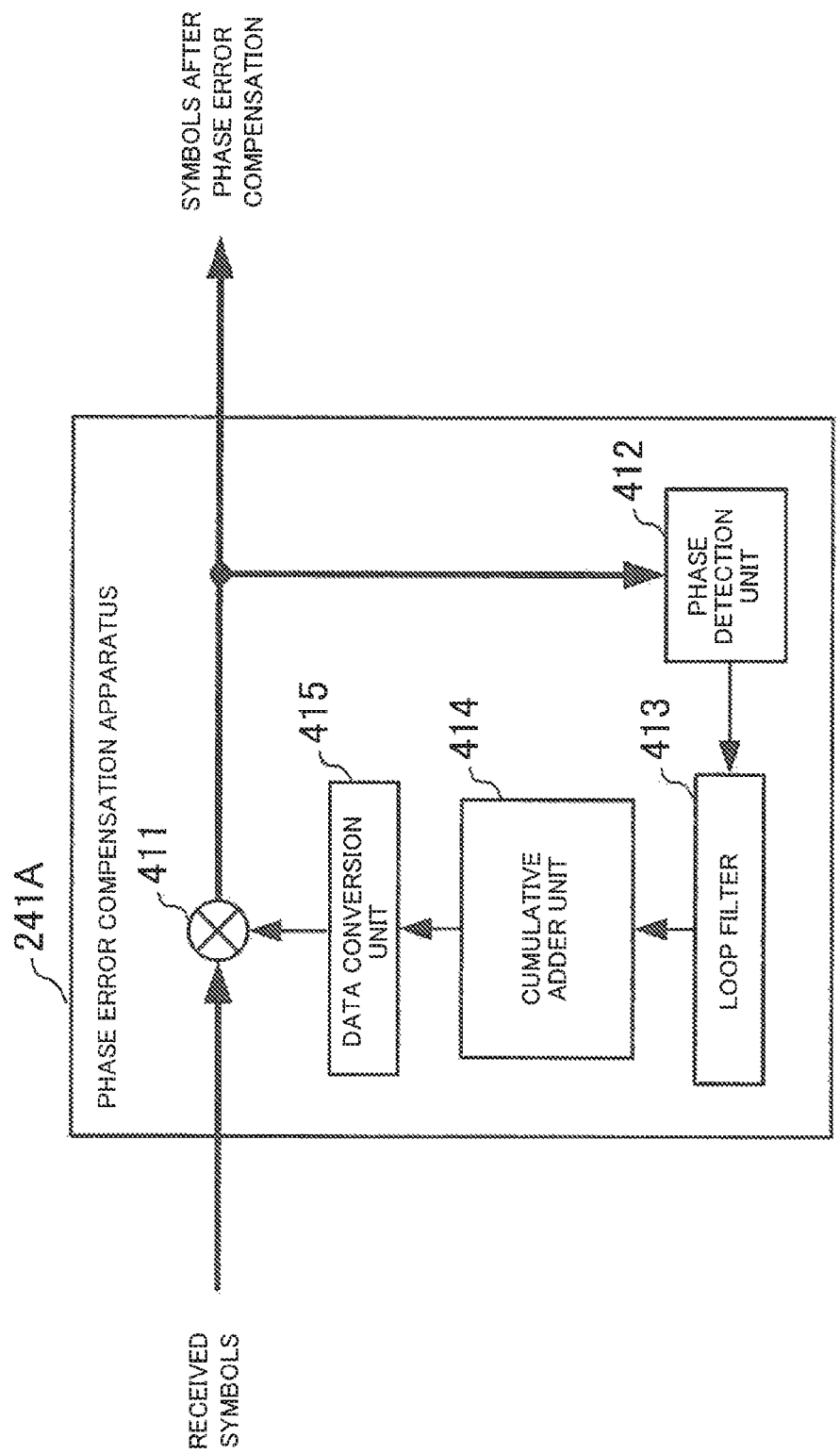

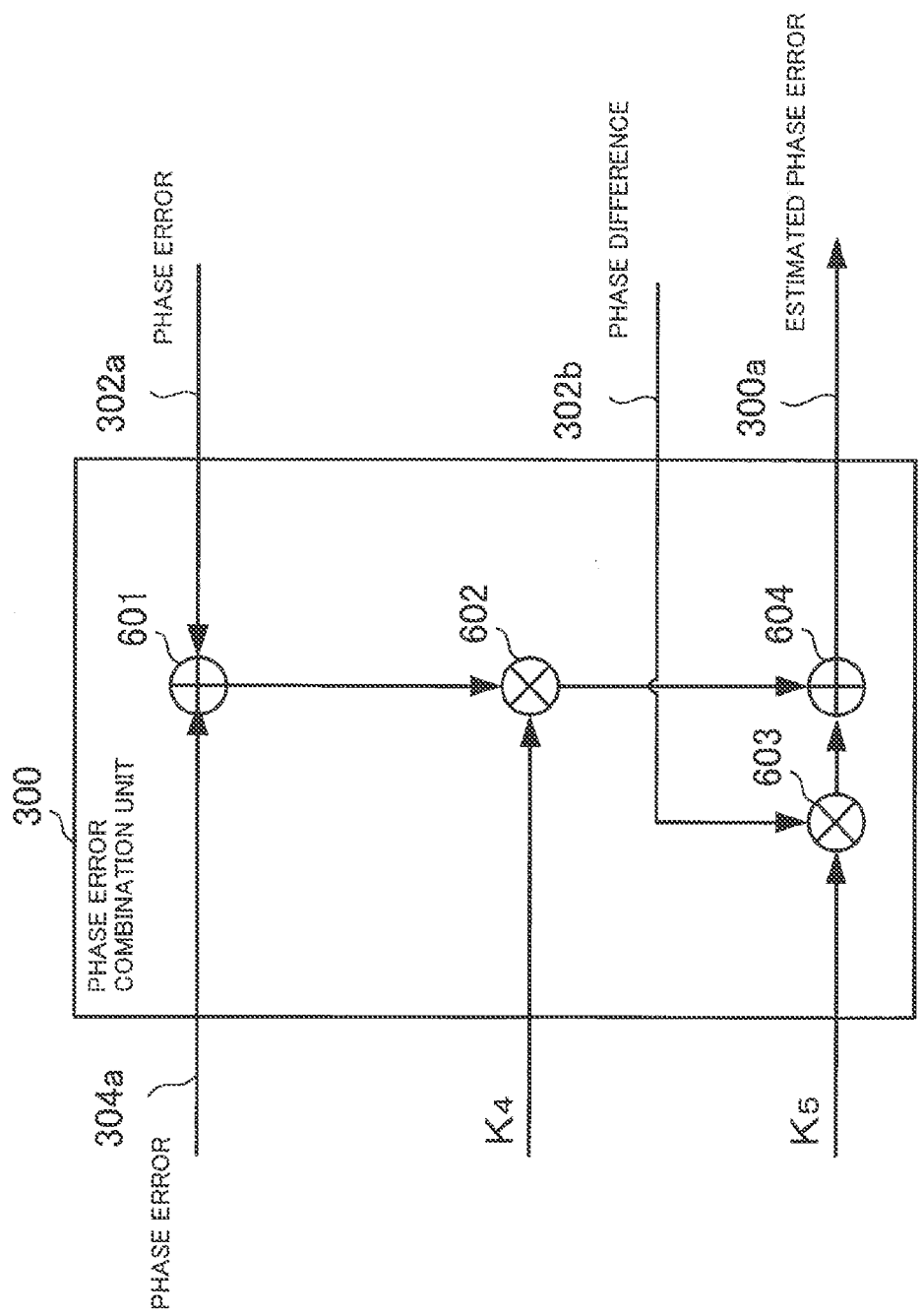

COMMUNICATION APPARATUS, DEMODULATION APPARATUS, CARRIER REPRODUCTION APPARATUS, PHASE ERROR COMPENSATION APPARATUS, PHASE ERROR COMPENSATION METHOD, AND STORAGE MEDIUM ON WHICH PHASE ERROR COMPENSATION PROGRAM HAS BEEN STORED

CROSS-REFERENCE TO RELATED APPLICATIONS

This application is a national stage application of International Application No. PCT/JP2015/000160 entitled "COMMUNICATION APPARATUS, DEMODULATION APPARATUS, CARRIER REPRODUCTION APPARATUS, PHASE ERROR COMPENSATION APPARATUS, PHASE ERROR COMPENSATION METHOD, AND STORAGE MEDIUM ON WHICH PHASE ERROR COMPENSATION PROGRAM HAS BEEN STORED," filed on Jan. 15, 2015, which claims the benefit of the priority of Japanese Patent Application No. 2014-006180 filed on Jan. 16, 2014, the disclosures of each of which are hereby incorporated by reference in their entirety.

TECHNICAL FIELD

The present invention relates to a communication apparatus, a demodulation apparatus, a carrier reproduction apparatus, a phase error compensation apparatus, a control method for the phase error compensation apparatus, and a storage medium stored with a control program for the phase error compensation apparatus.

BACKGROUND ART

In digital communication, as a modulation and demodulation method for performing efficient data transmission, a quadrature amplitude modulation (QAM) method in which both of phase information and amplitude information are used for data identification is well-known. In recent years, as a demand for capacity enlargement in a communication system, there has been a demand for increasing the modulation multi-level number. However, there is a problem that increasing the modulation multi-level number may increase a transmission error probability caused by noise, and lower noise resistance. In particular, phase noise mainly caused by a reference oscillator (LO; Local Oscillator) in a transmission apparatus and in a receiving apparatus may increase uncertainty of phase information, and may considerably deteriorate a bit error rate (BER). In view of the above, in order to perform data communication with enhanced reliability by a multi-level QAM method in which the number of signal points is e.g. 256 or larger, it is necessary to estimate a phase error caused by the phase noise with high precision, and to compensate the phase error. Concurrently, it is necessary to improve resistance against an error caused by other factors such as thermal noise.

In the aforementioned technical field, there is known a demodulation apparatus, in which a phase error is compensated by a phase locked loop, and a QAM symbol demapping apparatus for outputting a bit sequence reflecting likelihood information, and an error correction decoder for inputting the likelihood information and performing an error correction process are provided in the post-stage of the phase locked loop to implement improvement of error resistance. PTL 1 describes an example of the QAM symbol demapping apparatus.

However, it may be impossible to obtain a sufficiently improved bit error rate depending on a magnitude of phase noise included in a baseband signal to be output from a detector, or due to deterioration of precision of phase detection resulting from thermal noise or the like. In view of the above, there is known a technique for improving precision of phase error compensation by adaptively adjusting a bandwidth of a loop filter in a phase locked loop. PTL 2, PTL 3, and PTL 4 disclose the aforementioned technique. Error resistance, however, may yet be insufficient.

Further, there is known a demodulation method, in which a smoothing phase locked loop (S-PLL), which is an improved phase locked loop, is used in order to improve precision of phase error compensation. For instance, NPL 1 and NPL 2 disclose a principle on phase noise compensation by averaging as described above.

CITATION LIST

Patent Literature

[PTL 1] Re-publication of PCT International Publication No. WO2011/068119
[PTL 2] Japanese Laid-open Patent Publication No. 2000-101666
[PTL 3] Japanese Translation of PCT International Application Publication No. 2003-531523
[PTL 4] Japanese Laid-open Patent Publication No. 2011-101177

Non Patent Literature

[NPL 1] J. Yang, B. Geller, C. Herzet, J. M. Brossier, "Smoothing PLLs for QAM Dynamical Phase Estimation," IEEE ICC 2009 Proceedings, Jun. 14, 2009
[NPL 2] J. Yang, B. Geller, "Near Optimal Low Complexity Smoothing Loops for Dynamical Phase Estimation-Application to BPSK Modulated Signal," IEEE Transactions on Signal Processing, Sep. 1, 2009

SUMMARY OF INVENTION

Technical Problem

However, in the technique described in the aforementioned literatures, the effect of phase noise compensation by a phase locked loop is limited. Specifically, when the level of phase noise included in a baseband signal to be output from a detector is large, as compared with a multi-level number of a signal by a QAM method, it is impossible to obtain a sufficiently improved bit error rate, and it is difficult to perform large-capacity and high-quality data communication. Further, the same problem as described above may be applied to a smoothing phase locked loop. In particular, when a signal-to-noise ratio (SNR) is large, improvement cannot be expected, as compared with a phase locked loop. Therefore, it is impossible to obtain a sufficient bit error rate, and it is difficult to perform large-capacity and high-quality data communication.

An object of the present invention is to provide a technique for solving the aforementioned problems.

Solution to Problem

To achieve the object described above, a phase error compensation apparatus comprises:

a first phase error detection filter which generates a first phase difference value and a first phase error estimation value on the basis of received symbols in a forward sequence;

a second phase error detection filter which generates a second phase difference value and a second phase error estimation value on the basis of the received symbols in a reverse sequence;

a phase error combination means which generates a third phase error estimation value on the basis of the first phase error estimation value and the second phase error estimation value, and one of the first phase difference value and the second phase difference value; and a phase error compensation means which compensates a phase error in the received symbols in association with the third phase error estimation value.

To achieve the object described above, a carrier reproduction apparatus comprises:

the phase error compensation apparatus of any one of claims 1 to 5;

a symbol demapping means which demaps received symbols whose phase error is compensated by the phase error compensation apparatus; and an error correction decoding means which corrects an error included in the received symbols whose phase error is compensated on the basis of an output of the symbol demapping means, and outputs demodulated data.

To achieve the object described above, a demodulation apparatus comprises:

the carrier reproduction apparatus;

a reference oscillator which outputs a reference signal of a fixed frequency;

a detector which orthogonally detects an input signal of an intermediate frequency, and generates an Ich baseband signal and a Qch baseband signal; and an analog-to-digital converter which converts a generated baseband signal into a digital signal, and inputs the digital signal to the carrier reproduction apparatus as the received symbols.

To achieve the object described above, a communication apparatus comprises:

at least the demodulation apparatus;

a receiving circuit which selects a radio wave of a predetermined frequency band from radio waves to be received by an antenna to convert the selected radio wave into a signal of an intermediate frequency, and inputs the converted signal to the demodulation apparatus; and a received data decoding means which decodes demodulated data input by the demodulation apparatus, and generates received data.

To achieve the object described above, a phase error compensation method comprises:

generating a sequence of phase difference values $\varphi(1)$, $\varphi(2), \ldots, \varphi(M)$ (where M is a positive integer) between a sequence of received symbols and a sequence of reference symbols;

successively calculating first phase error estimation values $\theta^+(1), \theta^+(2), \ldots, \theta^+(M), \theta^+(M+1)$ caused by phase noise included in the sequence of phase difference values on the basis of the sequence of phase difference values;

successively calculating second phase error estimation values $\theta^-(M), \theta^-(M-1), \ldots, \theta^-(1)$ on the basis of the sequence of phase difference values $\varphi(M), \varphi(M-1), \varphi(1)$ by setting $\theta^+(M+1)$ as an initial value;

calculating third phase error estimation values $\theta^\pm(1)$, $\theta^\pm(2), \ldots, \theta^\pm(M)$ by linear computation of the first phase error estimation values $\theta^+(1), \theta^+(2), \ldots, \theta^+(M)$, the second phase error estimation values $\theta^-(1), \theta^-(2), \ldots, \theta^-(M)$, and the phase difference values $\varphi(1), \varphi(2), \ldots, \varphi(M)$;

successively calculating the first phase error estimation values, the second phase error estimation values, and the third phase error estimation values included in phase difference values $\varphi(kM+1), \varphi(kM+2), \ldots, \varphi((k+1)M)$ regarding a positive integer k by the calculation processes; and compensating a phase error by subtracting the third phase error estimation values $\theta^\pm(kM+1), \theta^\pm(kM+2), \ldots, \theta^\pm((k+1)M)$ from the phase difference values $\varphi(kM+1), \varphi(kM+2), \ldots, \varphi((k+1)M)$.

To achieve the object described above, a storage medium stored with a phase error compensation program which causes a computer to execute the processes of:

generating a sequence of phase difference values $\varphi(1)$, $\varphi(2), \ldots, \varphi(M)$ (where M is a positive integer) between a sequence of received symbols and a sequence of reference symbols;

successively calculating first phase error estimation values $\theta^+(1), \theta^+(2), \ldots, \theta^+(M), \theta^+(M+1)$ caused by phase noise included in the sequence of phase difference values on the basis of the sequence of phase difference values;

successively calculating second phase error estimation values $\theta^-(M), \theta^-(M-1), \ldots, \theta^-(1)$ on the basis of the sequence of phase difference values $\varphi(M), \varphi(M-1), \ldots, \varphi(1)$ by setting $\theta^+(M+1)$ as an initial value;

calculating third phase error estimation values $\theta^\pm(1)$, $\theta^\pm(2), \ldots, \theta^\pm(M)$ by linear computation of the first phase error estimation values $\theta^+(1), \theta^+(2), \ldots, \theta^+(M)$, the second phase error estimation values $\theta^-(1), \theta^-(2), \ldots, \theta^-(M)$, and the phase difference values $\varphi(1), \varphi(2), \ldots, \varphi(M)$;

successively calculating the first phase error estimation values, the second phase error estimation values, and the third phase error estimation values included in phase difference values $\varphi(kM+1), \varphi(kM+2), \ldots, \varphi((k+1)M)$ regarding a positive integer k by the calculation processes; and compensating a phase error by subtracting the third phase error estimation values $\theta^\pm(kM+1), \theta^\pm(kM+2), \ldots, \theta^\pm((k+1)M)$ from the phase difference values $\varphi(kM+1), \varphi(kM+2), \ldots, \varphi((k+1)M)$.

Advantageous Effects of Invention

According to the present invention, it is possible to perform large-capacity and high-quality data communication with an improved bit error rate even in an adverse noise environment mainly caused by phase noise or thermal noise.

BRIEF DESCRIPTION OF DRAWINGS

FIG. 2A is a block diagram illustrating a configuration of a communication apparatus including a phase error compensation apparatus in a second exemplary embodiment of the present invention.

FIG. 4A is a block diagram illustrating a configuration of a phase error compensation apparatus as a premise technique.

FIG. 6 is a block diagram illustrating a configuration of a phase error combination unit in the second exemplary embodiment of the present invention.

DESCRIPTION OF EMBODIMENTS

Figure 1:
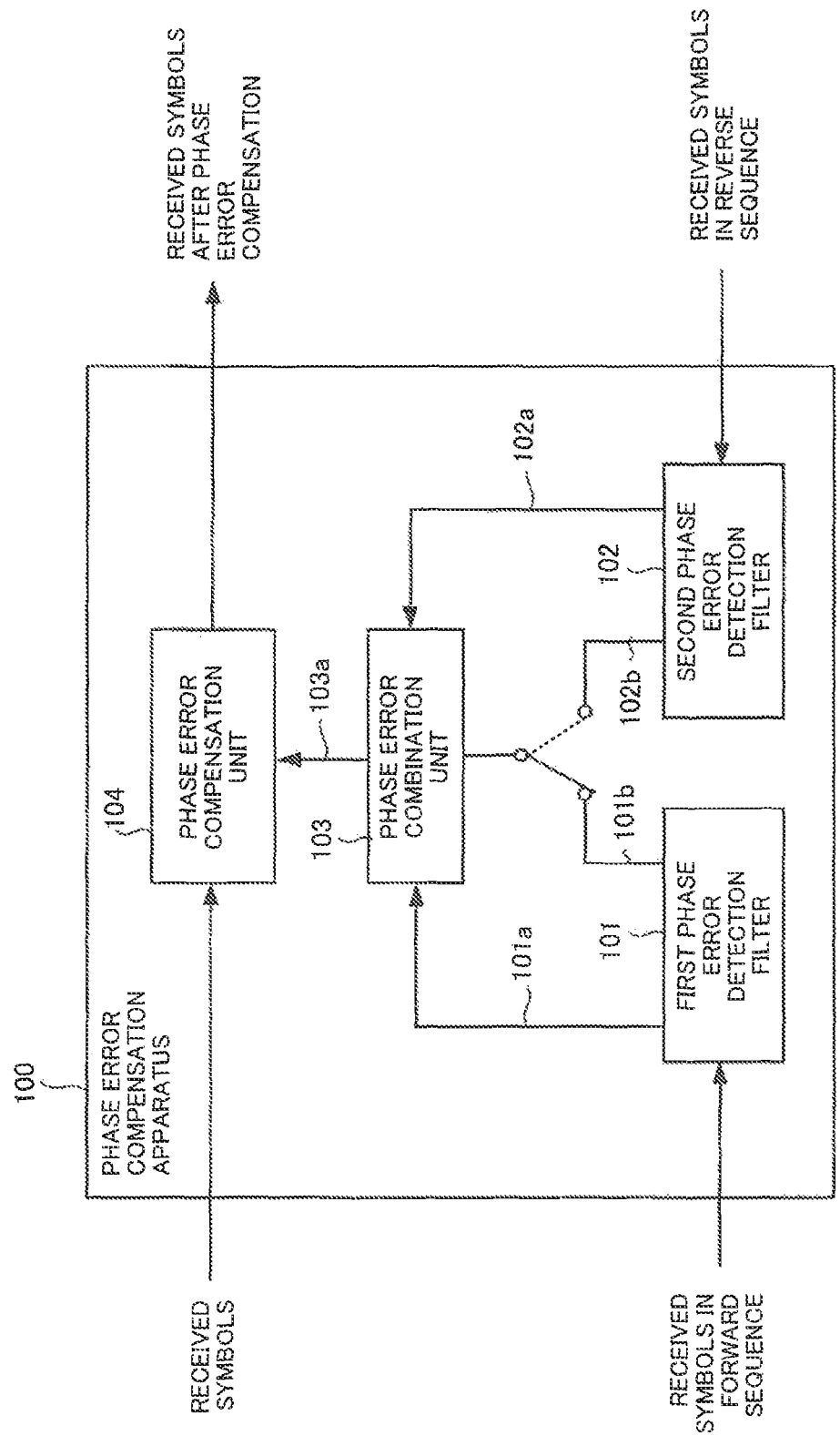
FIG. 1 is a block diagram illustrating a configuration of a phase error compensation apparatus in a first exemplary embodiment of the present invention.

In the following, exemplary embodiments of the present invention are illustratively described in detail referring to the drawings. Note that constituent elements described in the following exemplary embodiments are merely exemplary elements, and the technical scope of the present invention is not limited only to those elements.

First Exemplary Embodiment

A phase error compensation apparatus 100 as a first exemplary embodiment of the present invention is described using FIG. 1. The phase error compensation apparatus 100 is an apparatus for compensating phase noise generated in a reference oscillator, or thermal noise.

As illustrated in FIG. 1, the phase error compensation apparatus 100 includes a first phase error detection filter 101, a second phase error detection filter 102, a phase error combination unit 103, and a phase error compensation unit 104. The first phase error detection filter 101 generates a first phase difference value 101b and a first phase error estimation value 101a on the basis of received symbols in a forward sequence. The second phase error detection filter 102 generates a second phase difference value 102b and a second phase error estimation value 102a on the basis of the received symbols in a reverse sequence. A third phase error estimation value 103a is generated on the basis of the first phase error estimation value 101a and the second phase error estimation value 102a, and one of the first phase difference value 101b and the second phase difference value 102b. The phase error compensation unit 104 compensates phase error in received symbols according to the third phase error estimation value 103a.

According to the exemplary embodiment, a phase error is compensated by combining a phase error estimation value and a phase difference value generated on the basis of received symbols in a forward sequence and in a reverse sequence. Therefore, the aforementioned configuration makes it possible to perform large-capacity and high-quality data communication with an improved bit error rate, even in an adverse noise environment mainly caused by phase noise or thermal noise.

Second Exemplary Embodiment

Next, a phase error compensation apparatus in a second exemplary embodiment of the present invention is described. The phase error compensation apparatus in the exemplary embodiment compensates a phase error by combining a phase error estimation value and a phase difference value generated on the basis of received symbols in a forward sequence and in a reverse sequence. Further, in the exemplary embodiment, description is made regarding a carrier reproduction apparatus including a phase error compensation apparatus, a demodulation apparatus including the carrier reproduction apparatus, and a communication apparatus including the demodulation apparatus.

In the exemplary embodiment, a modulation method using phase information for data identification is used. In the exemplary embodiment, a QAM method is described as an example of a modulation method. It is possible to apply the exemplary embodiment, as far as the modulation method is a modulation method using phase information for data identification. Further, in the exemplary embodiment, a quasi-synchronous detection method, in which detection is performed on the basis of a periodic signal of a fixed frequency to be generated by a demodulation circuit itself, and a phase error is subtracted after the detection, is used as a detection method for a demodulation method. This detection method is advantageous because it is not necessary to generate a signal that is completely synchronous with a carrier wave. In the exemplary embodiment, a phase error compensation apparatus for compensating a phase error caused by phase noise by a quasi-synchronous detection method is provided. Note that description is simplified regarding an entire configuration of a demodulation apparatus by a quasi-synchronous detection method. Hereinafter, a section relating to phase error estimation, which is a core feature of the exemplary embodiment, is mainly described.

In a QAM method as a modulation and demodulation method, when the number of signal points is $2^m$ (where m is a positive integer), a bit sequence to be transmitted on the transmission side is divided per m-bit, and each m-bit is mapped at one of the $2^m$ signal points. It is possible to express mapped signal points in terms of complex numbers, which are referred to as transmitted symbols. A baseband signal detected on the receiving side and subsequently converted into a digital signal is received symbols associated with transmitted symbols. It is possible to express each of an Ich baseband signal and a Qch baseband signal in terms of complex numbers associated with a real part and an imaginary part. Hereinafter, the aforementioned complex numbers are referred to as received symbols. Received symbols serve as an input to the phase error compensation apparatus in the exemplary embodiment.

<<Configuration of Communication Apparatus>>

FIG. 2A is a block diagram illustrating a configuration of a communication apparatus including a phase error compensation apparatus 241 in the exemplary embodiment. It is possible to use the communication apparatus in the exemplary embodiment for providing a backhaul line indispensable for mobile phone services, digital data fixed line services, or the like. In particular, it is possible to use the communication apparatus in the exemplary embodiment as a high-quality and large-capacity digital communication line for connecting between base stations for providing mobile phone services. Note that the configuration of the communication apparatus is not limited to the configuration illustrated in FIG. 2A.

The communication apparatus in the exemplary embodiment includes, as a receiving system, a receiving circuit 202, a demodulation apparatus 200, and a received data decoding unit 203. The receiving circuit 202 selects a radio wave of a predetermined frequency band from radio waves received by an antenna 201 for converting into a signal of an intermediate frequency, and outputs the signal to the demodulation apparatus 200 in the exemplary embodiment. The received data decoding unit 203 decodes demodulated data to be output by the demodulation apparatus 200, and generates received data. Further, the communication apparatus in the exemplary embodiment may include, as a transmission system, a transmitted data encoding unit 205, a modulation apparatus 204, and a transmission circuit 206. The transmitted data encoding unit 205 encodes transmitted data. The modulation apparatus 204 modulates the encoded transmitted data in association with a demodulation method for the demodulation apparatus 200, and generates a signal of an intermediate frequency. The transmission circuit 206 generates a radio wave of a predetermined frequency band for transmission on the basis of a signal of an intermediate frequency, and transmits the radio wave from the antenna 201.

<<Configuration and Operation of Demodulation Apparatus>>

Figure 2B:
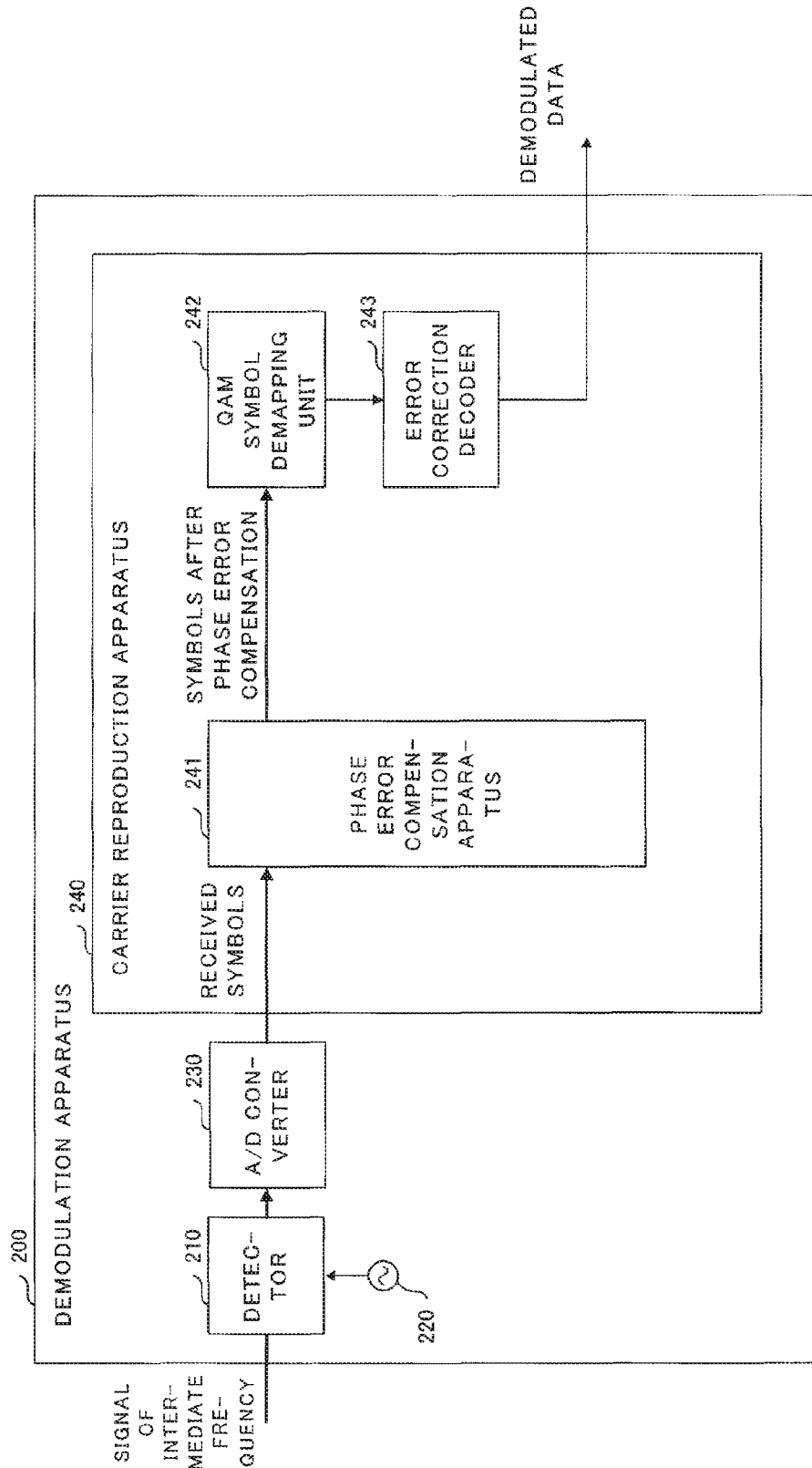
FIG. 2B is a block diagram illustrating a configuration of a demodulation apparatus including the phase error compensation apparatus in the second exemplary embodiment of the present invention.

FIG. 2B is a block diagram illustrating a configuration of the demodulation apparatus 200 including the phase error compensation apparatus 241 in the exemplary embodiment.

The demodulation apparatus 200 is an apparatus for demodulating a data signal that is modulated and transmitted by a QAM method. The demodulation apparatus 200 is provided with a reference oscillator 220, a detector 210, an analog-to-digital converter (hereinafter, referred to as an A/D converter) 230, and a carrier reproduction apparatus 240.

The reference oscillator 220 inputs a reference signal of a fixed frequency to the detector 210. The detector 210 orthogonally detects an input signal of an intermediate frequency (IF), and generates a baseband signal of a same phase component (Ich) and a baseband signal of an orthogonal component (Qch). Generated baseband signals are converted into digital signals by the A/D converter 230, and are input to the carrier reproduction apparatus 240 as received symbols.

The carrier reproduction apparatus 240 is provided with the phase error compensation apparatus 241 in the exemplary embodiment, a QAM symbol demapping unit 242, and an error correction decoder 243. The QAM symbol demapping unit 242 receives received symbols whose phase error is compensated by the phase error compensation apparatus 241, and generates input data to the error correction decoder 243, which is provided in the post-stage of the QAM symbol demapping unit 242. The error correction decoder 243 performs a process for correcting a bit error included in received symbols on the basis of data input from the QAM symbol demapping unit 242. Data after an error correction process serves as demodulated data, which is an output of the demodulation apparatus 200. In this case, when the number of times of performing phase error compensation by the phase error compensation apparatus 241 reaches a predetermined specific number of times, or when the error correction decoder 243 determines that there is no error, an output of the error correction decoder 243 is output as demodulated data of the demodulation apparatus 200. Otherwise, the phase error compensation apparatus 241 repeatedly compensates a phase error in received symbols to improve precision of compensation.

In the aforementioned configuration, it may be configured such that the carrier reproduction apparatus 240 temporarily holds input received symbols in a buffer, and compensates a phase error in the received symbols held in the buffer by using the phase error compensation apparatus 241 a plural number of times.

<<Phase Error Compensation Apparatus>>

Next, a configuration of the phase error compensation apparatus 241 in the exemplary embodiment is described. A premise technique relating to a configuration of a phase error compensation apparatus is described in order to clarify the features of the phase error compensation apparatus 241.

<<Configuration of Phase Error Compensation Apparatus as Premise Technique>>

FIG. 4A is a block diagram illustrating a configuration of a phase error compensation apparatus 241A as a premise technique. By replacing the phase error compensation apparatus 241 illustrated in FIG. 2B with the phase error compensation apparatus 241A illustrated in FIG. 4A, a demodulation apparatus as a premise technique is configured.

The phase error compensation apparatus 241A illustrated in FIG. 4A is provided with a phase locked loop (PLL) constituted by a rotation matrix multiplier 411, a phase detection unit 412, a loop filter 413, a cumulative adder unit 414, and a data conversion unit 415, which are connected in a loop.

The rotation matrix multiplier 411 rotates a phase of received symbols associated with each of an Ich baseband signal and a Qch baseband signal, which are digitized by the A/D converter 230 according to output information of the data conversion unit 415, to compensate a phase error. An output signal of the rotation matrix multiplier 411 is input to the phase detection unit 412.

The phase detection unit 412 detects a phase error remaining in the received symbols, and inputs the detected phase error to the loop filter 413. The loop filter 413 removes an unnecessary high frequency component included in a phase error, and inputs a phase error after removal of a high frequency component to the cumulative adder unit 414. The cumulative adder unit 414 generates phase error information for designating a phase rotation amount in the rotation matrix multiplier 411 on the basis of an input by the loop filter 413, and inputs the generated phase error information to the data conversion unit 415. The data conversion unit 415 converts the phase error information input by the cumulative adder unit 414 into sine data and cosine data associated with the input phase error information, and inputs the converted data to the rotation matrix multiplier 411.

As described above, it is possible to implement a stable phase locked state by an operation of a phase locked loop constituted by the rotation matrix multiplier 411, the phase detection unit 412, the loop filter 413, the cumulative adder unit 414, and the data conversion unit 415, which are connected in a loop, thereby compensating a phase error.

Note that the received symbols whose phase error is compensated by the rotation matrix multiplier 411 are also input to the QAM symbol demapping unit 242 in the carrier reproduction apparatus 240, as well as to the phase detection unit 412.

As described above, the phase error compensation apparatus 241A illustrated in FIG. 4A performs phase error compensation by a phase locked loop, and implements improvement of error resistance by an error correction process to be performed in the post-stage. However, it may be difficult to obtain a sufficiently improved bit error rate depending on a magnitude of phase noise included in a baseband signal to be output from the detector 210, or due to deterioration of precision of the phase detection unit 412 caused by thermal noise or the like.

Figure 4B:
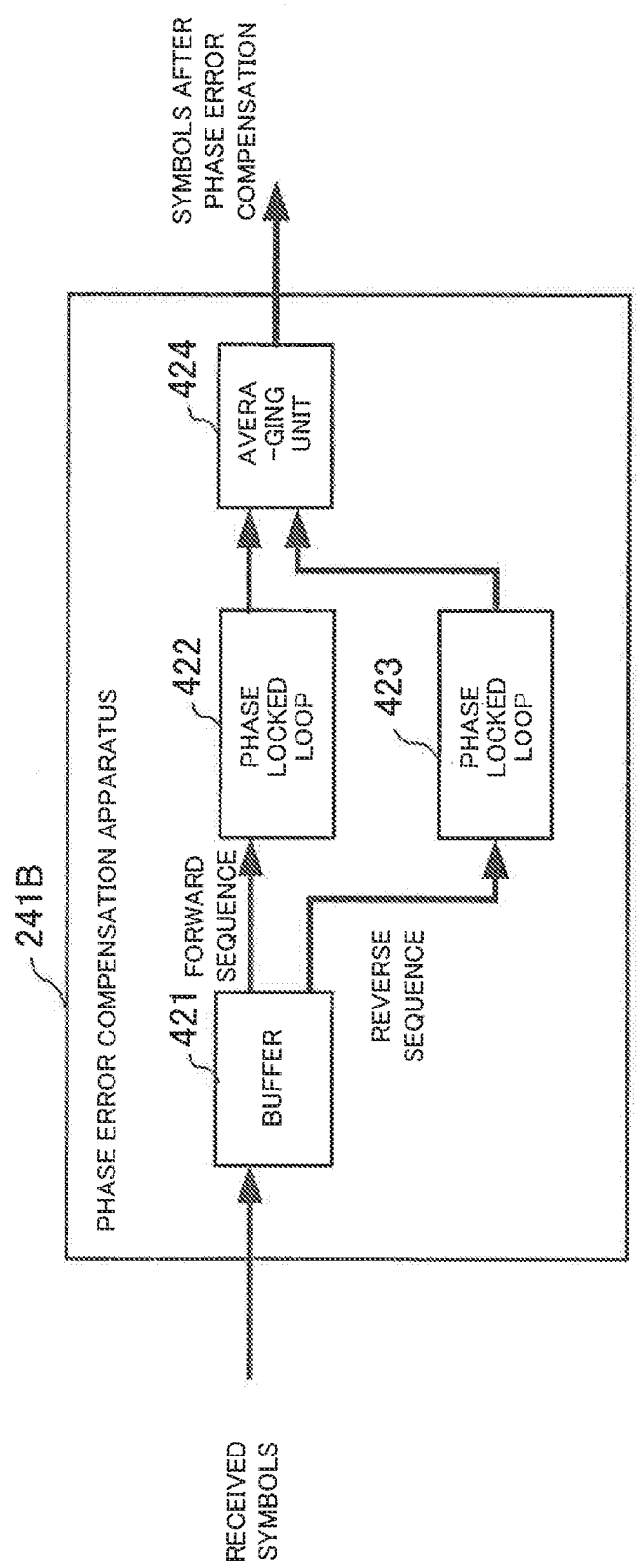
FIG. 4B is a block diagram illustrating a configuration of a phase error compensation apparatus as a premise technique.

FIG. 4B is a block diagram illustrating a configuration of a phase error compensation apparatus 241B as a premise technique. By replacing the phase error compensation apparatus 241 illustrated in FIG. 2B with the phase error compensation apparatus 241B illustrated in FIG. 4B, a demodulation apparatus as a premise technique is configured. The phase error compensation apparatus 241B illustrated in FIG. 4B employs a demodulation method in which a smoothing phase locked loop (S-PLL) being an improved phase locked loop is used in order to improve precision of phase error compensation.

The phase error compensation apparatus 241B employing a smoothing phase locked loop is constituted by a buffer 421, two phase locked loops 422 and 423, and an averaging unit 424. The buffer 421 temporarily holds an input to the phase error compensation apparatus 241B, and inputs one of two types of data sequences i.e. a data sequence in an input order and a data sequence whose order is reversed to the input order to one of the phase locked loops 422 and 423, and inputs the other of the two types of data sequences to the other of the phase locked loops 422 and 423. Each of the phase locked loops 422 and 423 processes the input data, and inputs a processing result to the averaging unit 424. The averaging unit 424 calculates an average of the two data which are processed in different orders, and outputs a calculation result.

However, the aforementioned smoothing phase locked loop may have a problem that when an SNR relating to thermal noise is large, precision of phase error compensation for thermal noise becomes substantially equal to precision obtained by an ordinary phase locked loop, and improvement appropriate for the increased amount of calculation is not observed.

<<Configuration of Phase Error Compensation Apparatus in Exemplary Embodiment>>

Figure 3:
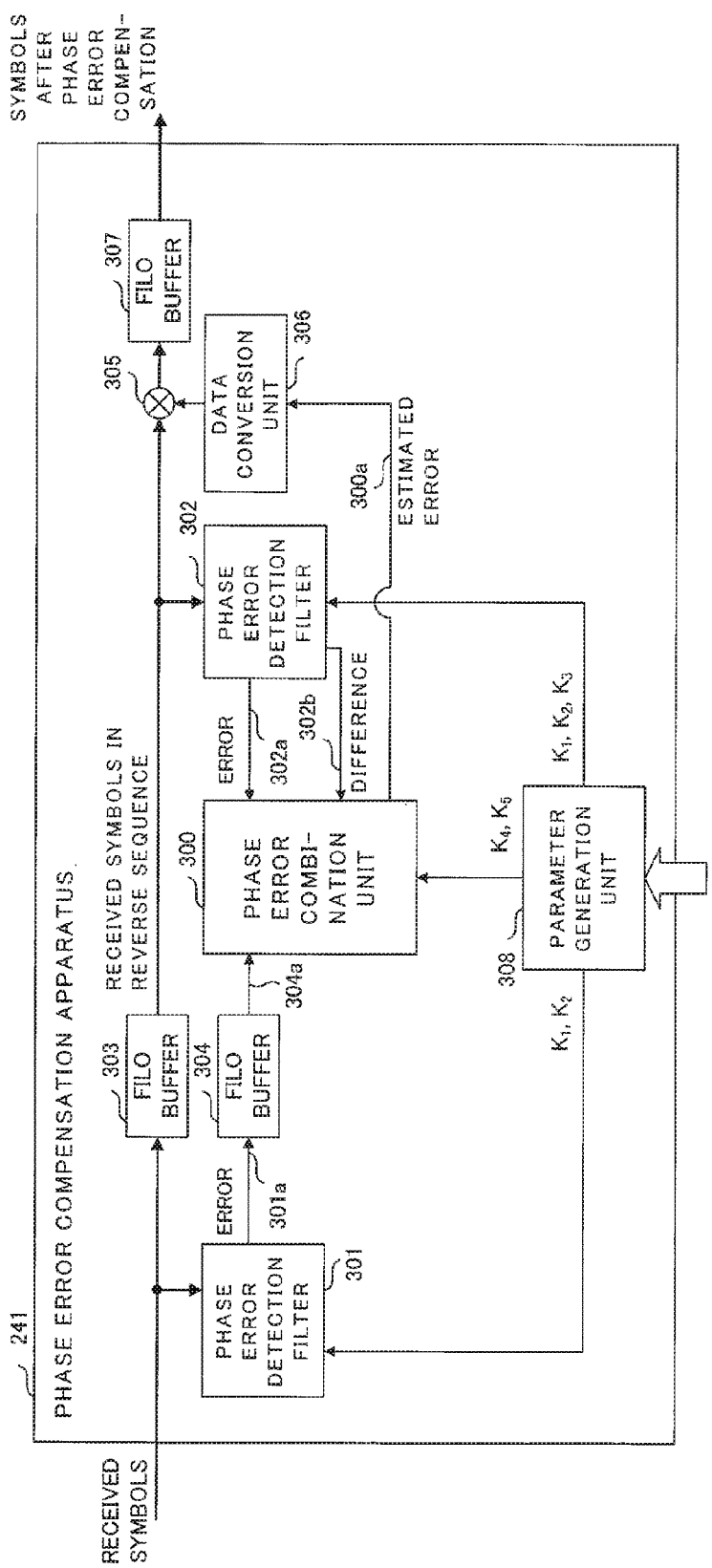
FIG. 3 is a block diagram illustrating a configuration of the phase error compensation apparatus in the second exemplary embodiment of the present invention.

FIG. 3 is a block diagram illustrating a configuration of the phase error compensation apparatus 241 in the exemplary embodiment. The phase error compensation apparatus 241 in the exemplary embodiment receives received symbols, estimates a phase error caused by phase noise of a reference oscillator, and outputs received symbols whose phase error is compensated.

The phase error compensation apparatus 241 illustrated in FIG. 3 is provided with a phase error detection filter 301 for received symbols in a forward sequence, a phase error detection filter 302 for received symbols in a reverse sequence, FILO buffers 303 and 304, and a phase error combination unit 300. Further, the phase error compensation apparatus 241 is provided with a data conversion unit 306, a rotation matrix multiplier 305, an FILO buffer 307, and a parameter generation unit 308.

The phase error detection filter 301 receives received symbols in a forward sequence, and outputs a difference between a phase of the received symbols in a forward sequence and a phase of estimated transmitted symbols generated inside the phase error compensation apparatus 241, and an estimated value of phase error generated in a phase of received symbols caused by phase noise. The phase error detection filter 302 receives received symbols in a reverse sequence, and outputs a difference between a phase of the received symbols in a reverse sequence and a phase of estimated transmitted symbols generated inside the phase error compensation apparatus 241, and an estimated value of phase error generated in a phase of received symbols caused by phase noise.

Each of the FILO buffers 303 and 304 is a first in/last out temporary storage unit which holds received symbols and an output data sequence of the phase error detection filter 301 by a predetermined fixed number of times, and outputs the received symbols and the output data sequence in the order reverse to an input order. Further, the FILO buffer 307 is a first in/last out temporary storage unit which converts received symbols in a reverse sequence whose phase error is compensated into received symbols in a forward sequence. Note that a storage unit of a predetermined capacity may be connected, in place of the FILO buffer 307, to control write addresses and read addresses.

The phase error combination unit 300 outputs an estimated value of phase error generated in a phase of received symbols caused by phase noise on the basis of an input from the phase error detection filters 301 and 302. A phase error estimation value 304a, whose sequence is reversed with respect to a phase error estimation value 301a from the phase error detection filter 301 by the FILO buffer 304, and a phase error estimation value 302a and a phase difference value 302b from the phase error detection filter 302 are input to the phase error compensation apparatus 241 illustrated in FIG. 3.

The data conversion unit 306 receives a phase error estimation value 300a, which is output data of the phase error combination unit 300, and outputs phase compensation data constituted by a sine value and a cosine value of an input value. The rotation matrix multiplier 305 receives received symbols, and a sine value and a cosine value, which are an output of the data conversion unit 306, and multiplies a rotation matrix including a sine value and a cosine value as components with received symbols to rotate a phase, and outputs a multiplication result via the FILO buffer 307.

The parameter generation unit 308 generates coefficients $K_1$ to $K_5$, which are used in one of the process by the phase error detection filters 301 and 302, and the process by the phase error combination unit 300 on the basis of a phase noise parameter of the reference oscillator 220 and a signal-to-noise ratio.

(Operation of Phase Error Compensation Apparatus)

Next, an operation of the phase error compensation apparatus 241 illustrated in FIG. 3 is described. The phase error compensation apparatus 241 receives received symbols, compensates a phase error including a phase of the received symbols, and outputs the received symbols after phase error compensation. Received symbols input to the phase error compensation apparatus 241 are r(1), r(2), ..., r(M) (where M is a positive integer). When it is assumed that transmitted symbols associated with the received symbols are s(1), s(2), ..., s(M), phase noise caused by an oscillator is θ(1), θ(2), ..., θ(M), and noise caused by thermal noise is w(1), w(2), ..., w(M), the received symbols can be expressed by Eq. (1).

[Math. 1]

$$r(n)=s(n)e^{j\theta(n)}+w(n), n=1,2,\ldots,M \quad (1)$$

Here, e is a Napier's constant, and j is an imaginary unit.

Figure 8:
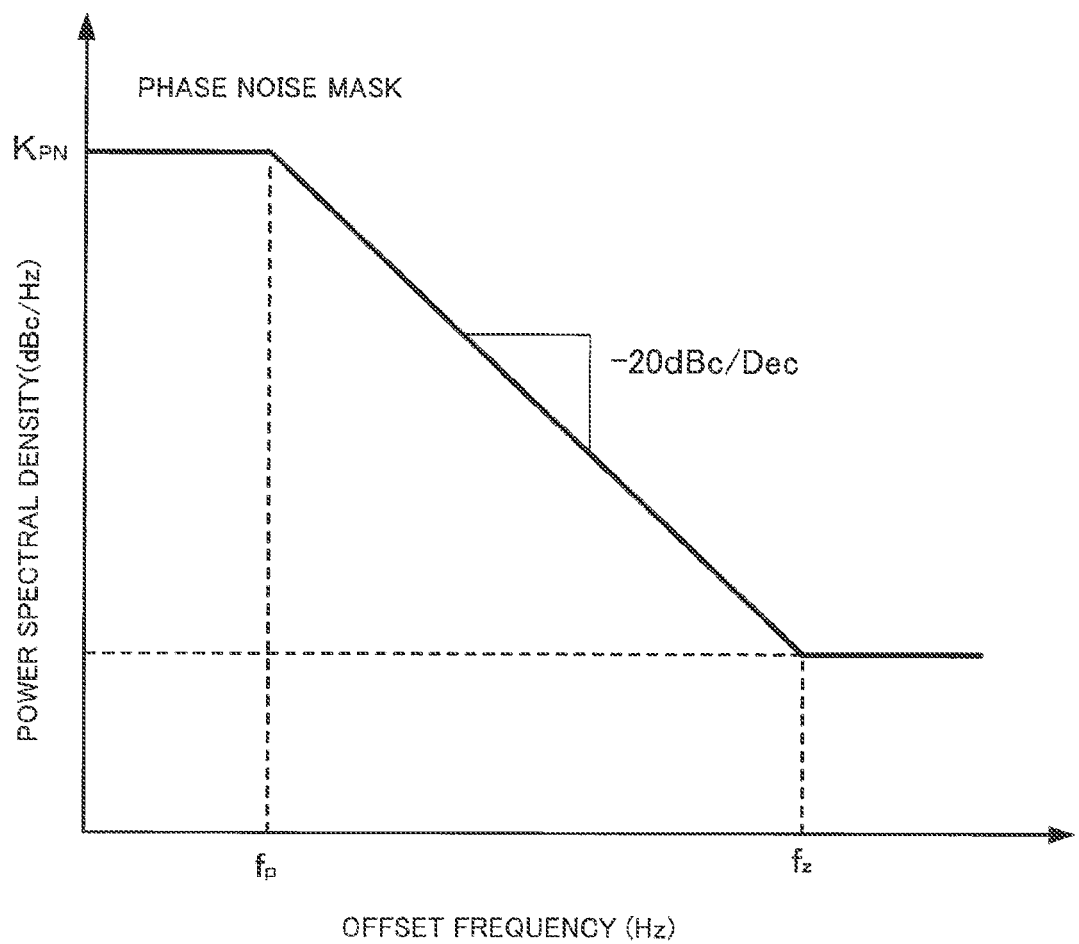
FIG. 8 is a diagram illustrating an example of a phase noise spectrum of a reference oscillator for generating parameters in the second exemplary embodiment of the present invention.

Thermal noise is white noise whose spectrum is flat. However, the spectrum of phase noise is not flat. As an example, a case is described in which the spectrum of phase noise has the shape as illustrated in FIG. 8.

Symbols for phase reference, which are a further input to the phase error compensation apparatus 241 illustrated in FIG. 3, are indicated by a(1), a(2), ..., a(M). When transmitted symbols are clear in advance, it is assumed that the symbols for phase reference coincide with the transmitted symbols. When transmitted symbols are not clear, and when it is possible to use estimated transmitted symbols after error correction, which are obtained after an error correction process, it is assumed that the symbols for phase reference coincide with the estimated transmitted symbols. Further, when it is impossible to use transmitted symbols, and estimated transmitted symbols after error correction, estimated transmitted symbols to be generated inside the phase error compensation apparatus 241 are used. Therefore, when transmitted symbols and estimated transmitted symbols after error correction are used, symbols for phase reference are not used, although the symbols for phase reference are input from the outside. When estimated transmitted symbols to be generated inside the phase error compensation apparatus 241 are used, an input of symbols for phase reference is assumed to be NULL. Note that the phase error compensation apparatus 241 illustrated in FIG. 3 uses estimated transmitted symbols to be generated inside the phase error compensation apparatus 241.

Symbols input to the phase error compensation apparatus 241 are input to the phase error detection filter 301. The phase error detection filter 301 calculates a phase error estimation value and a phase difference value on the basis of received symbols and estimated transmitted symbols, and outputs a calculation result. Each of the output data is numerical value data representing a phase. Output data relating to a phase error estimation value of the phase error detection filter 301 is indicated by θ⁺(1), θ⁺(2), ..., θ⁺(M). Output data relating to a phase difference value is indicated by φ(1), φ(2), ..., φ(M).

Note that in the example illustrated in FIG. 3, a phase difference value to be output from the phase error detection filter 301 is not used.

Received symbols, and the phase error estimation value 301a from the phase error detection filter 301 are respectively and temporarily held in the FILO buffers 303 and 304, and are output in the order reverse to an input order. Specifically, when received symbols are input in the order of r(1), r(2), ..., r(M), the received symbols are output in the order of r(M), r(M−1), ..., r(1). Further, when output data relating to a phase error estimation value is input in the order of θ⁺(1), θ⁺(2), ..., θ⁺(M), the output data is output in the order of θ⁺(M), θ⁺(M−1), ..., θ⁺(1). Received symbols respectively output from the FILO buffers 303 and 304 are input to the phase error detection filter 302, and the phase error estimation value 304a is input to the phase error combination unit 300.

Similarly to the phase error detection filter 301, the phase error detection filter 302 calculates the phase error estimation value 302a and the phase difference value 302b on the basis of received symbols and estimated transmitted symbols, and outputs a calculation result. The phase error detection filter 302 is different from the phase error detection filter 301 regarding an input order and initial value setting. Received symbols are input from the FILO buffer 303 to the phase error detection filter 302 in the order of r(M), r(M−1), ..., r(1). Further, an initial value is set on the basis of the coefficient K₃. Output data relating to phase error estimation by the phase error detection filter 302 is indicated by θ⁻(M), θ⁻(M−1), ..., θ⁻(1). An output of a phase difference value is indicated by φ(M), φ(M−1), ..., φ(1) with use of the same symbols as used in an output of the phase error detection filter 301.

Each of outputs of the phase error detection filters 301 and 302 is input to the phase error combination unit 300.

The phase error combination unit 300 combines the phase error estimation value 304a or 302a and the phase difference value 302b, and outputs the phase error estimation value 300a. An output of the phase error combination unit 300a is indicated by θ±(M), θ±(M−1), ..., θ±(1).

An output of the phase error combination unit 300 is converted into sine data sin(θ±(M)), sin(θ±(M−1)), ..., sin(θ±(1)), and cosine data cos(θ±(M)), cos(θ±(M−1)), ..., cos(θ±(1)). Sine data and cosine data are input to the rotation matrix multiplier 305, and compensate a phase of received symbols. An output of the rotation matrix multiplier 305, whose order is reversed by the FILO buffer 307, is output data of the phase error compensation apparatus 241. The output data can be expressed by Eq. (2) with use of the aforementioned notation.

[Math. 2]

$$r(n)e^{-j\theta_{\pm}(n)}, n=1,2,\ldots,M \quad (2)$$

(Configuration of Phase Error Detection Filter)

Figure 5:
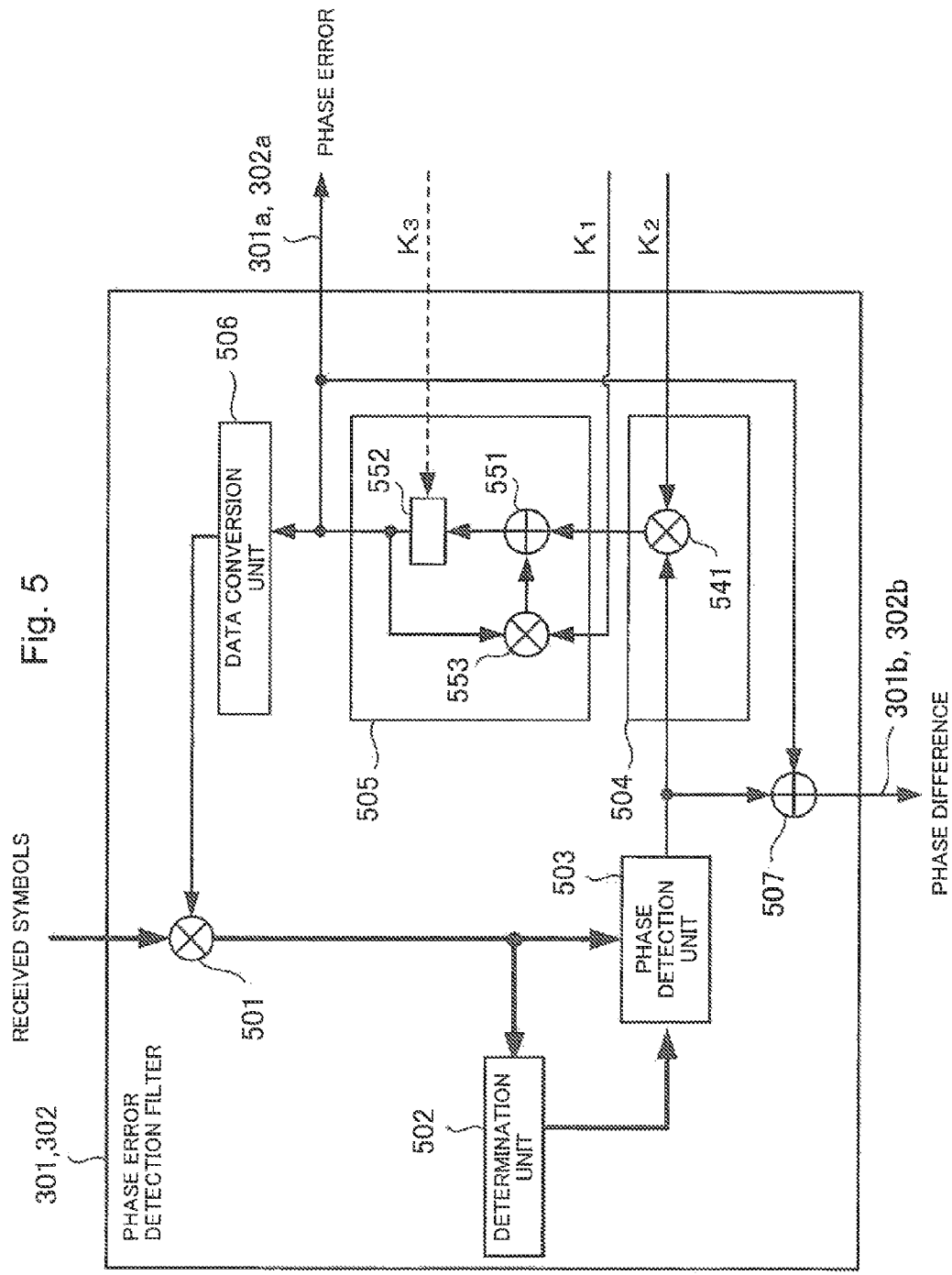
FIG. 5 is a block diagram illustrating a configuration of a phase error detection filter in the second exemplary embodiment of the present invention.

FIG. 5 is a block diagram illustrating a configuration of the phase error detection filters 301 and 302 in the exemplary embodiment. Note that the phase error detection filters 301 and 302 have the same configuration except for a point that the phase error detection filter 302 sets an initial value on the basis of the coefficient K₃. Therefore, the configurations of the phase error detection filters 301 and 302 are shared by FIG. 5.

Each of the phase error detection filters 301 and 302 illustrated in FIG. 5 receives received symbols, and outputs a difference between a phase of the received symbols and a phase of estimated transmitted symbols, and an estimated value of phase error generated in a phase of the received symbols caused by phase noise.

Each of the phase error detection filters 301 and 302 illustrated in FIG. 5 is provided with a phase detection unit 503, a one-tap filter 504, a cumulative adder unit 505 provided with a feedback coefficient, a data conversion unit 506, a rotation matrix multiplier 501, and a determination unit 502.

The phase detection unit 503 receives output symbols from the rotation matrix multiplier 501, and output symbols from the determination unit 502, and outputs a phase difference value between the output symbols. Output data serves as an input to the one-tap filter 504, which is provided in the subsequent-stage of the phase detection unit 503. The output data is added to an output of the cumulative adder unit 505 provided with a feedback coefficient by the adder 507. Then, the addition result serves as a phase difference value 301b or 302b, which is one of outputs of the phase error detection filter 301 or 302.

The one-tap filter 504 is a filter whose number of taps is one for removing a high frequency component. The one-tap filter 504 is constituted by a multiplier 541. The one-tap filter 504 receives an output of the phase detection unit 503, multiplies the output with the tap coefficient $K_2$, and outputs a multiplication result. The tap coefficient $K_2$ is given by the parameter generation unit 308. Note that the tap coefficient $K_2$ represents a degree of reflecting suddenly generated noise to phase error compensation, and is a value significantly smaller than 1.

The cumulative adder unit 505 provided with a feedback coefficient is constituted by an adder 551, a flip-flop 552, and a multiplier 553. The cumulative adder unit 505 receives an output of the one-tap filter 504, and outputs data held in the flip-flop 552. Note that in the phase error detection filter 302, a value on the basis of the initial coefficient $K_3$ is set in the flip-flop 552, as an initial value. An output of the cumulative adder 505 provided with a feedback coefficient is the phase error estimation value 301a or 302a, which is one of outputs of the phase error detection filter 301 or 302, and serves as an input to the data conversion unit 506 and to the adder 507. Further, the feedback coefficient $K_1$ of the multiplier 553 is given by the parameter generation unit 308. Note that the feedback coefficient $K_1$ represents a degree of reflecting an influence of previously received symbols on phase error compensation, and is a value smaller than 1.

The data conversion unit 506 receives a phase error estimation value output by the cumulative adder unit 505, and outputs a sine value and a cosine value associated with the phase error estimation value. The rotation matrix multiplier 501 multiplies a rotation matrix including, as components, a sine value and a cosine value, which are an output of the data conversion unit 506, with received symbols displayed in terms of complex numbers, and rotates a phase of the received symbols by a numerical value corresponding to an output of the cumulative adder unit 505 to compensate a phase.

The determination unit 502 receives received symbols whose phase is compensated by the rotation matrix multiplier 501, and inputs transmitted symbols closest to the input received symbols to the phase detection unit 503.

(Operation of Phase Error Detection Filter)

Next, an operation of each of the phase error detection filters 301 and 302 is described. Although the phase error compensation apparatus 241 is provided with the phase error detection filters 301 and 302, an operation of generating output data according to input data is the same between the phase error detection filters 301 and 302. Therefore, an operation of the phase error detection filter 301 is described as an example. Note that as initial setting, it is necessary to set an initial value of the flip-flop 552 in the cumulative adder unit 505 provided with a feedback coefficient to a determined appropriate value. Unless otherwise specifically designated, the initial value is set to "b 0".

Received symbols input to the phase error detection filter 301 are input to the rotation matrix multiplier 501. Similarly to the rotation matrix multiplier 305, the rotation matrix multiplier 501 rotates a phase of received symbols according to output data from the data conversion unit 506. When it is assumed that input received symbols at the point of time n are indicated by r(n), and data held in the flip-flop 552 is indicated by $\theta^+(n)$ (where n is an integer of not smaller than 1 but not larger than M), an output of the rotation matrix multiplier 501 can be expressed by Eq. (3).

[Math. 3]

$$r(n)e^{-j\theta^+(n)}, n=1,2,\ldots,M \quad (3)$$

An output of the rotation matrix multiplier 501 expressed by Eq. (3) is input to the determination unit 502 and to the phase detection unit 503. The determination unit 502 outputs transmitted symbols closest to the data expressed by Eq. (3). An output of the determination unit 502 is input to the phase detection unit 503. The phase detection unit 503 calculates a phase difference between two input symbols, and outputs a calculation result. When it is assumed that a phase difference between received symbols, and output symbols of the determination unit 502 is indicated by $\varphi(1), \varphi(2), \ldots, \varphi(M)$, an output of the phase detection unit 503 at the point of time n is numerical value data expressed by Eq. (4) on the basis of Eq. (3).

[Math. 4]

$$\theta(n)-\theta^+(n), n=1,2,\ldots,M \quad (4)$$

An output of the phase detection unit 503 is input to the one-tap filter 504 and to the adder 507.

The other input to the adder 507 is a phase error output $\theta^+(1), \theta^+(2), \ldots, \theta^+(M)$. Therefore, by Eq. (4), an output of the adder 507 is phase difference values $\varphi(1), \varphi(2), \ldots, \varphi(M)$. On the other hand, in the one-tap filter 504, an output of the phase detection unit 503, and the tap coefficient $K_2$ to be supplied from the parameter generation unit 308 are multiplied by the multiplier 541. Then, the multiplication result is input to the cumulative adder unit 505 provided with a feedback coefficient.

The adder 551 in the cumulative adder unit 505 provided with a feedback coefficient adds an output of the one-tap filter 504, and data of the flip-flop 552, which is multiplied by the multiplier 553 with the feedback coefficient $K_1$ to be supplied from the parameter generation unit 308. Then, data of the flip-flop 552 is updated on the basis of the addition result. Data $\theta^+(n)$ of the flip-flop 552, which is held at the point of time n, is updated at the next point of time (n+1) as expressed by Eq. (5).

[Math. 5]

$$\theta^+(n) \leftarrow K_1\theta^+(n)+K_2(\varphi(n)-\theta^+(n)) \quad (5)$$

Output data of the flip-flop 552 is output from the phase error detection filter 301 as the phase error estimation value 301a, and is used for rotating a phase of input received symbols r(n+1) at the point of time (n+1) by the data conversion unit 506. Thereafter, by the same operation as described above, phase error estimation values $\theta^+(1), \theta^+(2), \ldots, \theta^+(M)$, and phase difference values $\varphi(1), \varphi(2), \ldots, \varphi(M)$ are generated and output.

Note that data $\theta^+(M+1)$ is generated by the aforementioned procedure defined by using Eq. (5) from the M-th input received symbol r(M), and data $\theta^+(M)$ of the flip-flop 552 at the point of time M. Then, the data $\theta^+(M+1)$ is used as an initial value of the flip-flop 552 in the phase error detection filter 302. The phase error detection filter 302 generates and outputs phase error estimation values $\theta^-(M)$, $\theta^-(M-1), \ldots, \theta^-(1)$ according to the procedure expressed by Eq. (6).

[Math. 6]

$$\theta^-(n-1) \leftarrow K_1\theta^-(n)+K_2(\varphi(n)-\theta^-(n)) \quad (6)$$

(Configuration of Phase Error Combination Unit)

FIG. 6 is a block diagram illustrating a configuration of the phase error combination unit 300 in the exemplary embodiment. The phase error combination unit 300 receives an output from the phase error detection filter 301 or 302, and outputs an estimated value of phase error generated in a phase of received symbols caused by phase noise.

The phase error combination unit 300 illustrated in FIG. 6 is provided with two adders 601 and 604, and two multipliers 602 and 603. The adder 601 adds the phase error estimation value 304a in a reverse sequence from the phase error detection filter 301, and the phase error estimation value 302a from the phase error detection filter 302, and inputs the addition result to the multiplier 602. The multiplier 602 multiplies the addition result by the adder 601 with the multiplication coefficient $K_4$ generated by the parameter generation unit 308, and inputs the multiplication result to the adder 604.

The multiplier 603 multiplies the multiplication coefficient $K_5$ generated by the parameter generation unit 308 with the phase difference value 302b from the phase error detection filter 302, and inputs the multiplication result to the adder 604.

The adder 604 adds an input by the multiplier 602 and an input by the multiplier 603, and sets the addition result as an output of the phase error combination unit 300.

(Operation of Phase Error Combination Unit)

Next, an operation of the phase error combination unit 300 is described. The phase error combination unit 300 receives an output of the phase error detection filters 301 and 302, and outputs the phase error estimation value 300a. The adder 601 successively calculates $\theta^+(n)+\theta^-(n)$, where n=M, M-1, ..., 1 on the basis of the phase error estimation value 301a i.e. $\theta^+(1), \theta^+(2), \ldots, \theta^+(M)$, and the phase error estimation value 302a i.e. $\theta^-(M), \theta^-(M-1), \ldots, \theta^-(1)$. Then, the multiplier 602 multiplies the multiplication coefficient $K_4$ to be supplied from the parameter generation unit 308 with $\theta^+(n)+\theta^-(n)$, and obtains $K_4 \times (\theta^+(n)+\theta^-(n))$, where n=M, M-1, ..., 1. On the other hand, the multiplier 603 multiplies the multiplication coefficient $K_5$ to be supplied from the parameter generation unit 308 with the phase difference value 302b from the phase error detection filter 302, and obtains $K_5 \times \varphi(M), K_5 \times \varphi(M-1), \ldots, K_5 \times \varphi(1)$.

An output of the multiplier 602 and an output of the multiplier 603 are added by the adder 604, and the phase error estimation value 300a i.e. $\theta^\pm(M), \theta^\pm(M-1), \ldots, \theta^\pm(1)$ as expressed by Eq. (7) is obtained. Specifically, the multiplication coefficients $K_4$ and $K_5$ play a role of a weighting factor which reflects one of a phase error estimation value output from the phase error detection filter 301 or 302, and a phase difference value according to reliability with respect to the phase error estimation value 300a.

[Math. 7]

$$\theta^\pm(n) \leftarrow K_4(\theta^+(n)+\theta^-(n))+K_5\varphi(n), n=1,2,\ldots,M \quad (7)$$

(Configuration of Parameter Generation Unit)

Figure 7A:
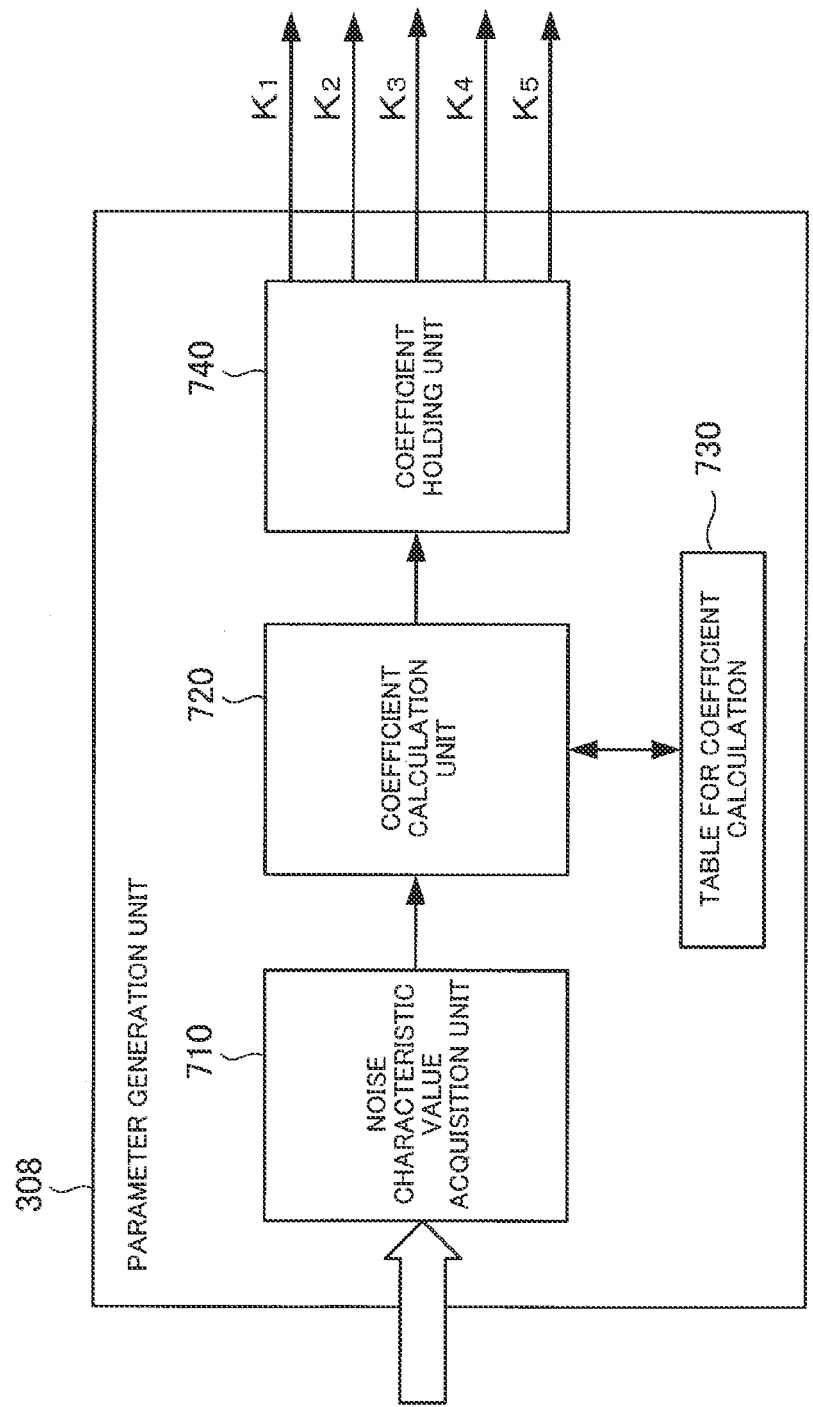
FIG. 7A is a block diagram illustrating a configuration of a parameter generation unit in the second exemplary embodiment of the present invention.

FIG. 7A is a block diagram illustrating a configuration of the parameter generation unit 308 in the present exemplary embodiment.

The parameter generation unit 308 illustrated in FIG. 7A is provided with a noise characteristic value acquisition unit 710, a coefficient calculation unit 720, a table 730 for coefficient calculation, and a coefficient holding unit 740. The noise characteristic value acquisition unit 710 acquires a noise characteristic value of the reference oscillator 220. Note that a noise characteristic value of the reference oscillator 220 may be manually input by an operator, or may be automatically detected by an apparatus. The coefficient calculation unit 720 calculates the coefficients $K_1$ to $K_5$ according to a predetermined algorithm with use of the table 730 for coefficient calculation. The coefficient holding unit 740 holds the coefficients $K_1$ to $K_5$ calculated by the coefficient calculation unit 720. Note that it may be configured such that calculation of the coefficients $K_1$ to $K_5$ is performed by an additionally prepared computer, and the calculation result is held in the coefficient holding unit 740.

(Table for Coefficient Calculation)

Figure 7B:
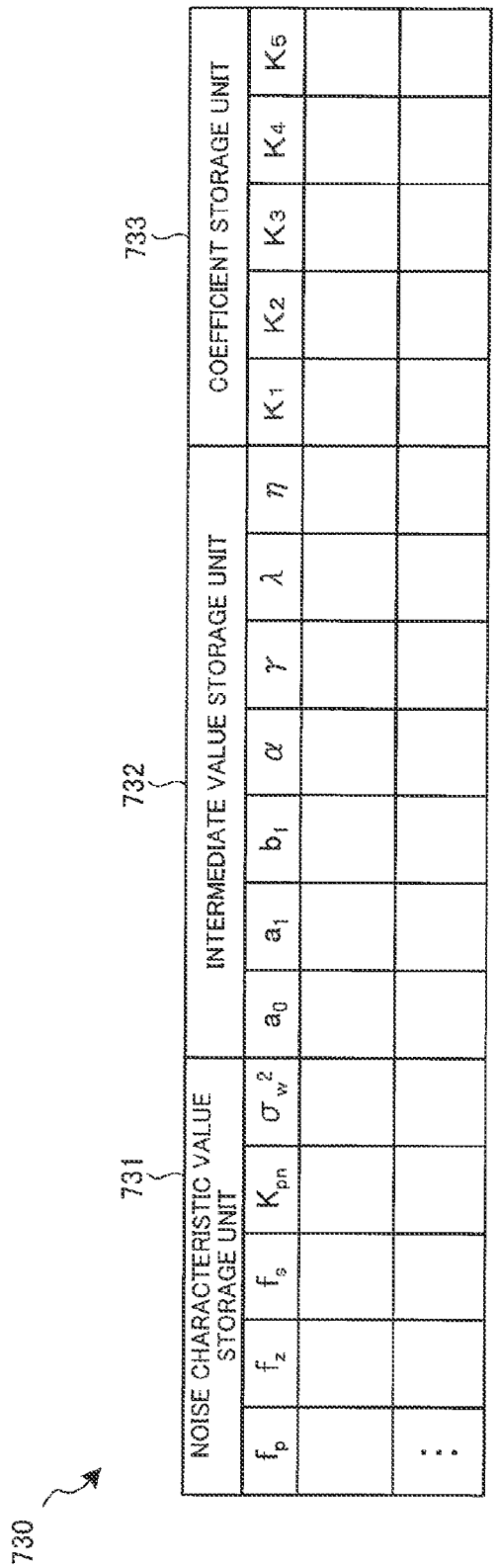
FIG. 7B is a diagram illustrating a configuration of a table for coefficient calculation in the second exemplary embodiment of the present invention.

FIG. 7B is a diagram illustrating a configuration of the table 730 for coefficient calculation in the present exemplary embodiment. The table 730 for coefficient calculation is used for generating the coefficients $K_1$ to $K_5$ by the coefficient calculation unit 720 on the basis of a noise characteristic value of the reference oscillator 220.

In the table 730 for coefficient calculation, an intermediate value storage unit 732 and a coefficient storage unit 733 are stored in association with a noise characteristic value storage unit 731. The noise characteristic value storage unit 731 stores $f_p$, $f_z$, $f_s$, $K_{pn}$, and $\sigma_w^2$, which are noise characteristic values of the reference oscillator 220 necessary for coefficient calculation. The intermediate value storage unit 732 stores e.g. $a_0$, $a_1$, $b_1$, $\alpha$, $\gamma$, $\lambda$, and $\eta$, which are intermediate values for coefficient calculation. The coefficient storage unit 733 stores the calculated coefficients $K_1$, $K_2$, $K_3$, $K_4$, and $K_5$.

(Operation of Parameter Generation Unit)

Next, calculation of the coefficients $K_1$ to $K_5$ is described.

FIG. 8 is a diagram illustrating an example of a phase noise spectrum of a reference oscillator for parameter generation in the present exemplary embodiment. In the following calculation of the coefficients $K_1$ to $K_5$, an example is described in which a phase noise spectrum of a reference oscillator is modeled as illustrated in FIG. 8. As illustrated in FIG. 8, a phase noise spectrum is constant when the frequency is not larger than $f_p$(Hz) but not smaller than $f_z$(Hz). The phase noise spectrum has gradient characteristics of −20 dBc/Dec between $f_p$(Hz) and $f_z$(Hz). As illustrated in FIG. 8, power spectral density at frequency 0 (Hz) is indicated by $K_{pn}$, and a transmission symbol rate is indicated by $f_s$(Hz). Phase noise of the reference oscillator 220 is designated by the four parameters $f_p$, $f_z$, $f_s$, and $K_{pn}$. Noise is designated by the five parameters including a parameter $\sigma_w^2$, which relates to a variance of thermal noise in addition to the aforementioned four parameters.

The parameter generation unit 308 generates the feedback coefficient $K_1$ relating to the phase error detection filters 301 and 302, the tap coefficient $K_2$, the initial coefficient $K_3$ relating to the phase error detection filter 302, and the multiplication coefficients $K_4$ and $K_5$ relating to the phase error combination unit 300 on the basis of these five parameters. In the following, an example of a process for generating the coefficients is described.

Three constants $a_0$, $a_1$, and $b_1$ are defined by Eq. (8).

[Math. 8]

$$a_0 = \frac{1 + \frac{f_s}{\pi f_z}}{1 + \frac{f_s}{\pi f_p}}, a_1 = \frac{-1 + \frac{f_s}{\pi f_z}}{1 + \frac{f_s}{\pi f_p}}, b_1 = \frac{-1 + \frac{f_s}{\pi f_p}}{1 + \frac{f_s}{\pi f_p}} \quad (8)$$

Note that the ratio of the circumference of a circle to its diameter is indicated by $\pi$.

Two constants $\alpha$ and $\gamma$ are defined by Eq. (9) using the three constants $a_0$, $a_1$, and $b_1$ determined by Eq. (8).

[Math. 9]

$$\alpha = \gamma \frac{b_1}{1 - b_1^2} \left( \frac{a_1}{a_0} + \frac{a_0}{a_1} - \frac{1 + b_1^2}{b_1} \right),$$
$$\gamma = K_{PN} f_s \frac{a_0 a_1}{b_1} \quad (9)$$

The constants $\lambda$ and $\eta$ are defined by Eq. (10) on the basis of $\alpha$ and $\gamma$ expressed in Eq. (9), and $b_1$ expressed in Eq. (8), and further on the basis of the constant $\sigma_w^2$, which is determined from a variance value of thermal noise.

[Math. 10]

$$\lambda = \frac{\eta}{2} - \sqrt{\left(\frac{\eta}{2}\right)^2 - 1}, \eta = \frac{1 + b_1^2}{b_1} + \frac{\alpha}{\sigma_w^2 + \gamma} \cdot \frac{1 - b_1^2}{b_1^2} \quad (10)$$

The feedback coefficient $K_1$ and the tap coefficient $K_2$ to be generated by the parameter generation unit 308 are calculated by Eq. (11).

[Math. 11]

$$K_1 = b_1 - \lambda, K_2 = b_1 \quad (11)$$

The multiplication coefficients $K_4$ and $K_5$ to be generated by the parameter generation unit 308 are calculated by Eq. (12).

[Math. 12]

$$K_4 = \frac{\sigma_w^2}{\sigma_w^2 + \gamma} \cdot \frac{\lambda(1 - \lambda b_1)}{b_1(1 - \lambda^2)}, K_5 = \frac{K_1 K_4}{K_2 - K_1} + \frac{\gamma}{\sigma_w^2 + \gamma} \quad (12)$$

Further, the initial coefficient $K_3$ is defined as Eq. (13) by $b_1$, $\lambda$, and $K_1$ respectively expressed in Eq. (8), Eq. (10), and Eq. (11).

[Math. 13]

$$K_3 = \frac{K_1}{1 - \lambda b_1} \quad (13)$$

<<Processing Procedure by Phase Noise Compensation Method>>

Figure 9:
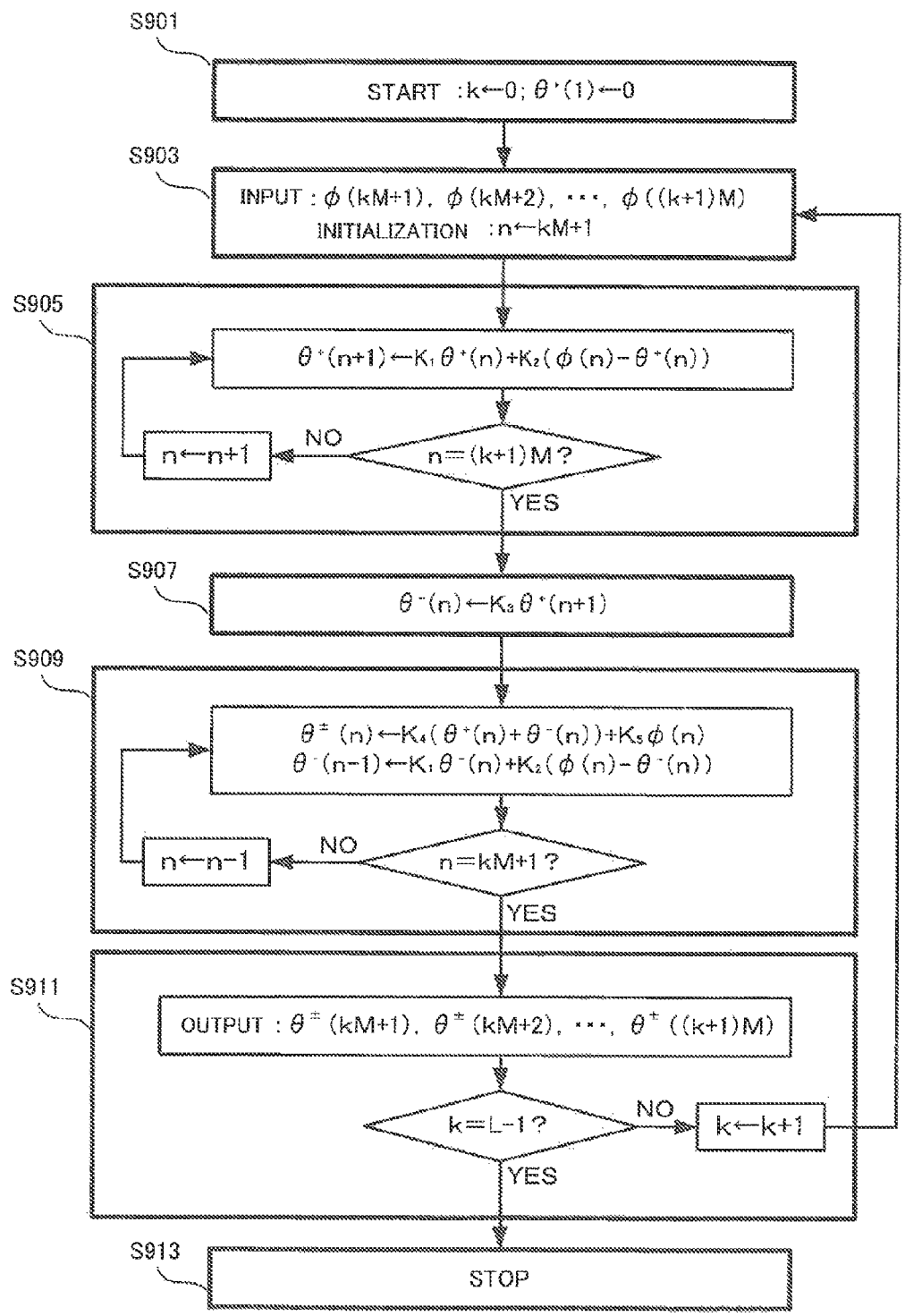
FIG. 9 is a flowchart illustrating a processing procedure of a phase noise compensation method in the second exemplary embodiment of the present invention.

FIG. 9 is a flowchart illustrating a processing procedure by a phase noise compensation method in the present exemplary embodiment. The flowchart is associated with a phase error compensation program to be executed by a CPU constituting the phase error compensation apparatus 241 with use of an RAM. The flowchart implements each of the functional configuration units illustrated in FIG. 3.

In Step S901, the phase error compensation apparatus 241 performs initialization ($k\_0$; $\theta^+(1)\_0$). In this example, out of two parameters to be initialized, k is an index indicating a processing frame, and $\theta^+(1)$ is a phase error estimation value on the basis of received symbols in a forward sequence at the point of time 1.

In Step S903, the phase error compensation apparatus 241 generates a sequence of phase difference values $\varphi(1)$, $\varphi(2)$, ..., $\varphi(M)$ between received symbols and estimated transmitted symbols, and performs initialization ($n\_1$). In this example, M is a positive integer representing the length of a frame as a processing unit.

In Step S905, the phase error compensation apparatus 241 successively calculates, from a sequence of phase difference values, phase error estimation values $\theta^+(1)$, $\theta^+(2)$, ..., $\theta^+(M)$, $\theta^+(M+1)$ caused by phase noise included in the sequence of phase difference values according to Eq. (5).

In Step S907, the phase error compensation apparatus 241 initializes $\theta^-(M)$ with use of $\theta^+(M+1)$. In this example, $\theta^-(M)$ is a phase error estimation value on the basis of received symbols in a reverse sequence at the point of time M.

In Step S909, the phase error compensation apparatus 241 successively calculates phase error estimation values $\theta^-(M)$, $\theta^-(M-1)$, ..., $\theta^-(1)$ from a sequence of phase difference values $\varphi(M)$, $\varphi(M-1)$, ..., $\varphi(1)$ according to Eq. (6). Further, in Step S907, the phase error compensation apparatus 241 calculates phase error estimation values $\theta^\pm(1)$, $\theta^\pm(2)$, ..., $\theta^\pm(M)$ by linear computation of phase error estimation values $\theta^+(1)$, $\theta^+(2)$, ..., $\theta^+(M)$, phase error estimation values $\theta^-(1)$, $\theta^-(2)$, ..., $\theta^-(M)$, and phase difference values $\varphi(1)$, $\varphi(2)$, ..., $\varphi(M)$ according to Eq. (7).

In Step S911, the phase error compensation apparatus 241 successively repeats calculation of phase error estimation values $\theta^+(kM+i)$ (where i=1 to M+1), $\theta^-(kM+i)$ (where i=1 to M), and $\theta^\pm(kM+i)$ (where i=1 to M), which are included in phase differences $\varphi(kM+1)$, $\varphi(kM+2)$, ..., $\varphi((k+1)M)$ regarding a positive integer k on the basis of the process of each step as described above. Then, the phase error compensation apparatus 241 outputs phase error estimation values $\theta^\pm(kM+1)$, $\theta^\pm(kM+2)$, ..., $\theta^\pm((k+1)M)$.

Each of the aforementioned steps is repeated regarding the positive integer k by assuming that the positive integer is k+1 in the same manner as described above. When the positive integer k reaches a predetermined integer value (L−1), the processing is terminated. By the aforementioned procedure, it is possible to calculate phase error estimation values $\theta^\pm(1)$, ..., $\theta^\pm(kM+2)$, ..., $\theta^\pm(LM)$ with respect to phase differences $\varphi(1)$, ..., $\varphi(kM+2)$, ..., $\varphi(LM)$.

Then, a phase error is compensated by subtracting calculated phase error estimation values $\theta^\pm(kM+1)$, $\theta^\pm(kM+2)$, ..., $\theta^\pm((k+1)M)$ from phase differences $\varphi(kM+1)$, $\varphi(kM+2)$, ..., $\varphi((k+1)M)$, respectively.

<<Result of Phase Error Compensation>>

Figure 10:
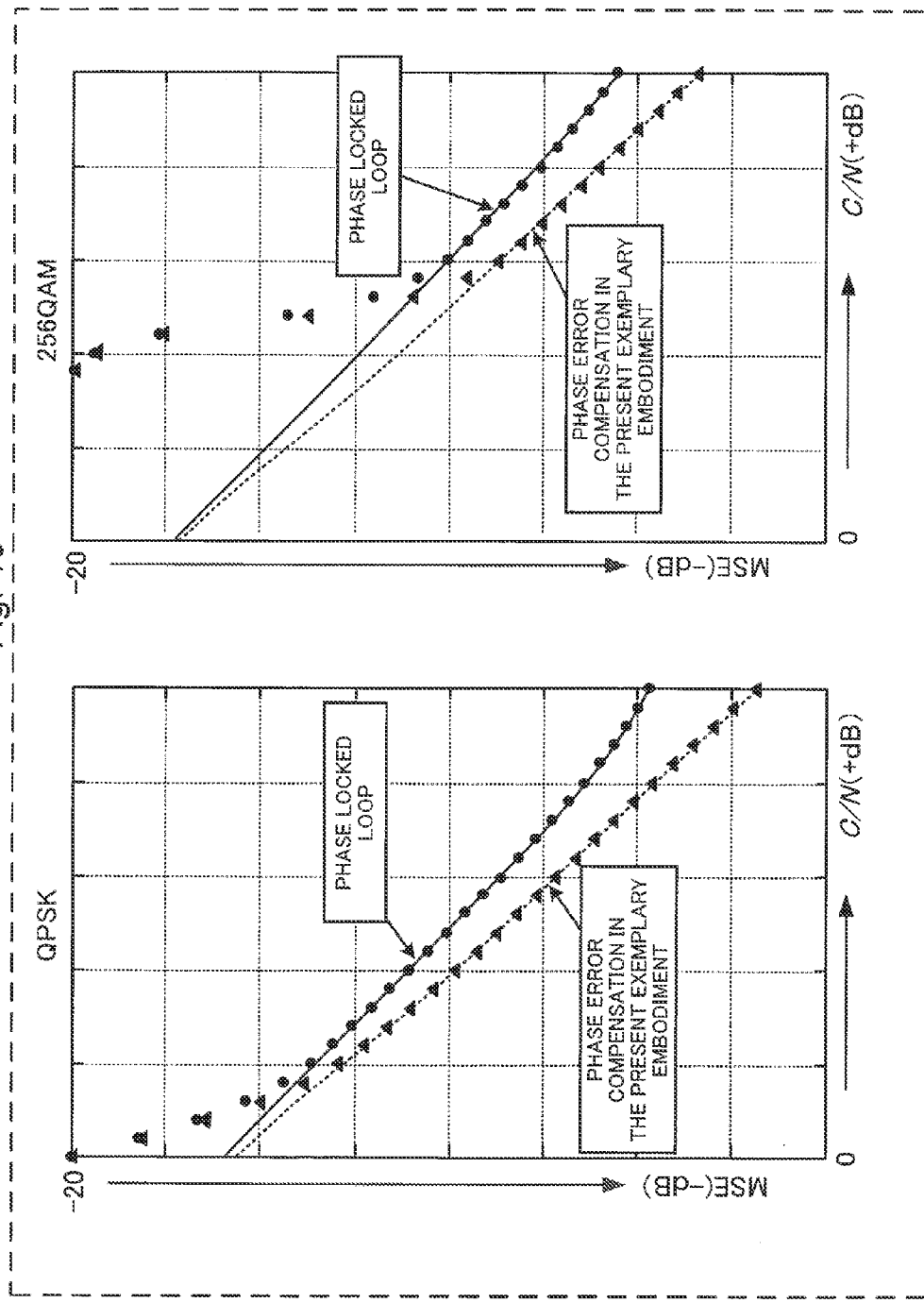
FIG. 10 are graph diagrams illustrating a relationship between a mean square error and a carrier-to-noise ratio relating to phase error when QPSK transmission is performed and when 256 QAM transmission is performed with use of the phase error compensation method in the second exemplary embodiment of the present invention in comparison with a conventional art.

FIG. 10 are graphs illustrating a relationship between a mean square error and a carrier-to-noise ratio relating to a phase error when QPSK modulation is performed and when 256 QAM modulation is performed with use of the phase error compensation method in the exemplary embodiment in comparison with a conventional art.

In the example illustrated in FIG. 10, four parameters $f_p$, $f_z$, $f_s$, and $K_{pn}$ are respectively set as $f_p$=100 Hz, $f_z$=7 MHz, $f_s$=24 MHz, and $K_{pn}$=−35 dBc/Hz in the phase noise spectrum illustrated in FIG. 8. Data transmission is performed respectively by QPSK modulation and by 256 QAM modulation in a communication path including phase noise to be defined by the aforementioned parameters. A mean square error relating to a phase after compensation by the phase error compensation method in the exemplary embodiment is compared with a mean square error in a phase locked loop by the premise technique illustrated in FIG. 3A. A result of the comparison is illustrated in FIG. 10.

The horizontal axis denotes a carrier-to-noise ratio caused by thermal noise, and the vertical axis denotes a mean square error in terms of decibel. The marks ● (circle mark) and ▲ (triangle mark) illustrated in FIG. 10 respectively represent simulation results of a mean square error relating to phase error compensation by a phase locked loop and relating to the phase error compensation method in the present exemplary embodiment. In the simulations, an input of symbols for phase reference is assumed to be NULL. Further, the solid lines and the dotted lines illustrated in FIG. 10 respectively represent theoretical values of a mean square error. In a region where the carrier-to-noise ratio is large, the theoretical values coincide with the simulations.

As is clear from the example illustrated in FIG. 10, remarkable improvement is observed in both of the QPSK modulation method and the 256 QAM modulation method.

In the present exemplary embodiment, a phase error is compensated by combining a phase error estimation value and a phase difference value that are generated on the basis of received symbols in a forward sequence and in a reverse sequence. Note that in the present exemplary embodiment, phase error compensation is implemented by eliminating a redundant configuration. Therefore, it is possible to perform large-capacity and high-quality data communication with an improved bit error rate even in an adverse noise environment mainly caused by phase noise or thermal noise by a simplified configuration.

Third Exemplary Embodiment

Next, a phase error compensation apparatus in a third exemplary embodiment of the present invention is described. The phase error compensation apparatus in the present exemplary embodiment is different from the phase error compensation apparatus in the second exemplary embodiment in a point that whereas the phase error combination unit in the second exemplary embodiment uses phase difference values generated on the basis of received symbols in a reverse sequence, a phase error combination unit in the third exemplary embodiment uses phase difference values generated on the basis of received symbols in a forward sequence. The other configuration and operation in the third exemplary embodiment are the same as the configuration and operation in the second exemplary embodiment. Therefore, the same configuration and operation in the third exemplary embodiment as those in the second exemplary embodiment are indicated by the same reference signs, and detailed description thereof is omitted herein.

<<Configuration of Phase Error Compensation Apparatus>>

Figure 11:
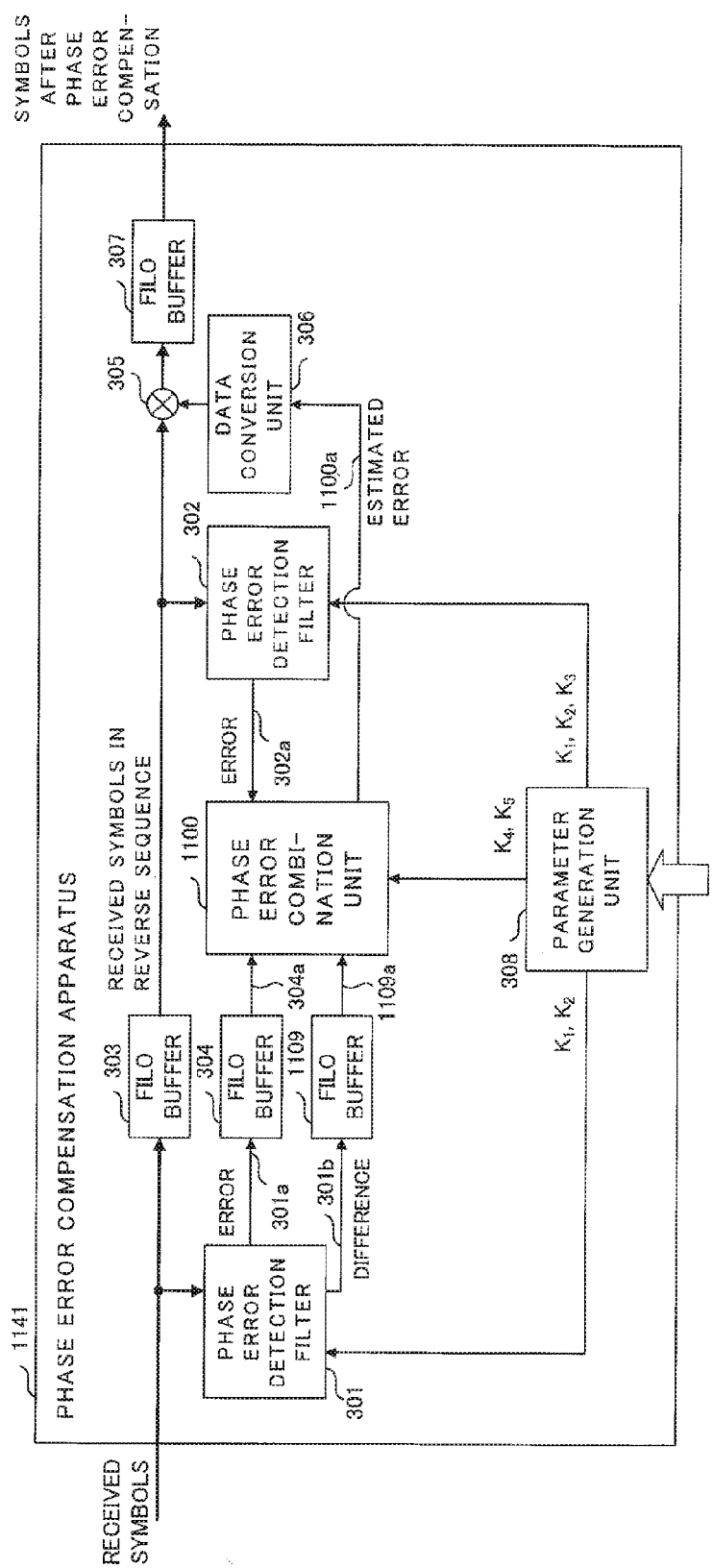
FIG. 11 is a block diagram illustrating a configuration of a phase error compensation apparatus in a third exemplary embodiment of the present invention.

FIG. 11 is a block diagram illustrating a configuration of a phase error compensation apparatus 1141 in the present exemplary embodiment. Note that in FIG. 11, the same functional configuration units as those in FIG. 3 are indicated by the same reference signs, and description thereof is omitted herein.

The phase error compensation apparatus 1141 includes an FILO buffer 1109. Phase difference values output from a phase error detection filter 301 are input in the order of $\varphi(1)$, $\varphi(2)$, ..., $\varphi(M)$, and are output in the order of $\varphi(M)$, $\varphi(M-1)$, ..., $\varphi(1)$. Then, a phase error combination unit 1100 inputs an estimated phase error estimation value 1100a to a data conversion unit 306 with use of $\varphi(M)$, $\varphi(M-1)$, ..., $\varphi(1)$ output from the FILO buffer 1109, as a phase error difference value.

(Configuration of Phase Error Combination Unit)

Figure 12:
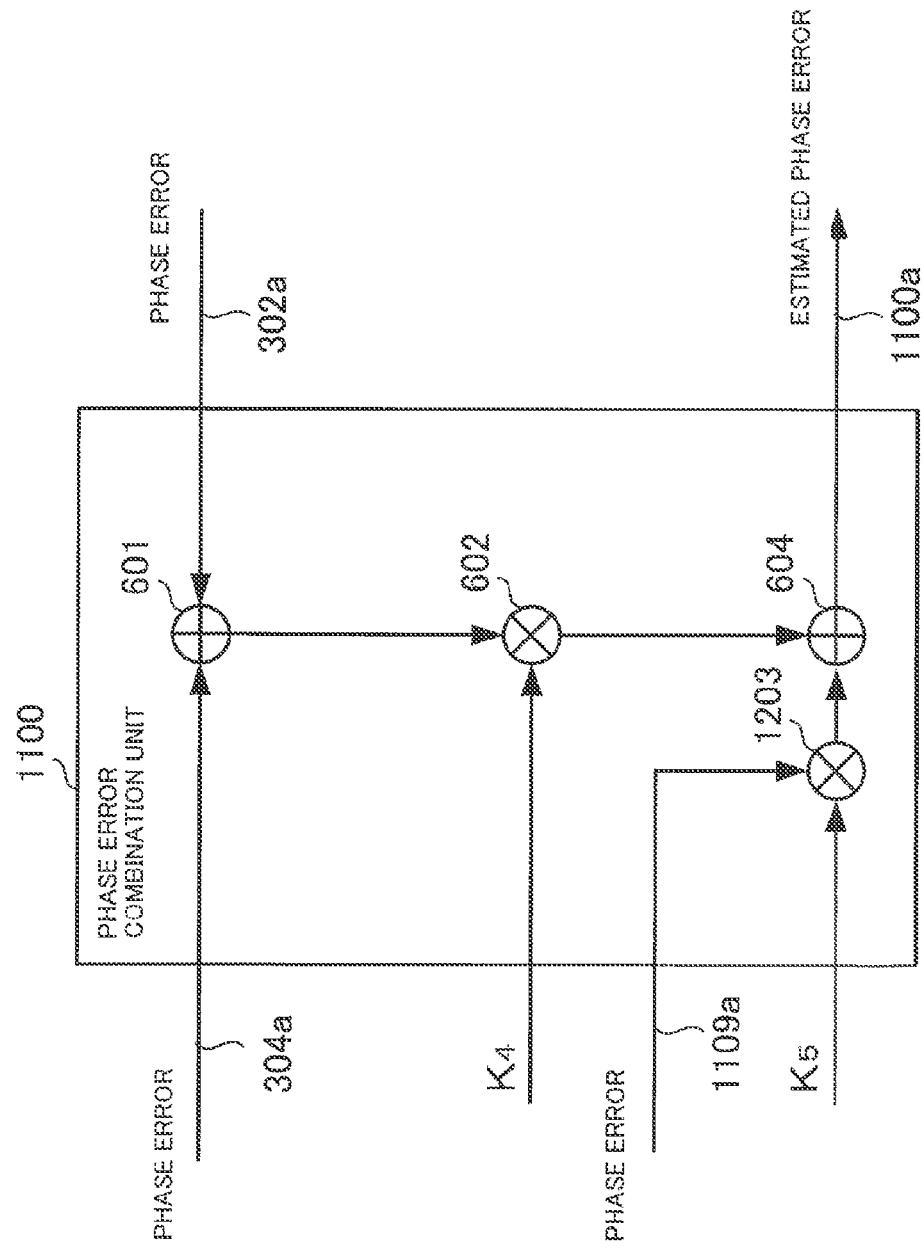
FIG. 12 is a block diagram illustrating a configuration of a phase error combination unit in the third exemplary embodiment of the present invention.

FIG. 12 is a block diagram illustrating a configuration of the phase error combination unit 1100 in the present exemplary embodiment. Note that in FIG. 12, the same functional configuration units as those in FIG. 5 are indicated by the same reference signs, and description thereof is omitted herein.

A multiplier 1203 multiplies a multiplication coefficient $K_5$ to be supplied from a parameter generation unit 308 with $\varphi(M), \varphi(M-1), \ldots, \varphi(1)$, which are phase difference values whose sequence is reversed by the FILO buffer 1109 with respect to a phase difference value 301b from the phase error detection filter 301, and obtains $K_5 \times \varphi(M)$, $K_5 \times \varphi(M-1)$, ..., $K_5 \times \varphi(1)$. The multiplication result of the multiplier 1203 is added to a multiplication result of a multiplier 602 by an adder 604. Then, the phase error estimation value 1100a is output.

According to the present exemplary embodiment, although the FILO buffer 1109 is added, it is possible to implement more accurate phase error compensation, and it is possible to perform large-capacity and high-quality data communication with an improved bit error rate.

Note that it is possible to configure such that a selector is provided anterior to a multiplier 603 or the multiplier 1203 in the phase error combination unit, and an input is selected by the selector depending on in which one of the configurations of the second and third exemplary embodiments, a phase error combination unit is used.

Fourth Exemplary Embodiment

Next, a phase error compensation apparatus in a fourth exemplary embodiment of the present invention is described. The phase error compensation apparatus in the present exemplary embodiment is different from the phase error compensation apparatuses in the second and third exemplary embodiments in a point that decoded data generated from symbols as a result of phase error compensation are inversely converted into transmitted symbols for reference, and the transmitted symbols for reference are used for phase error compensation. The other configuration and operation in the fourth exemplary embodiment are the same as the configuration and operation in the second or third exemplary embodiment. Therefore, the same configuration and operation in the fourth exemplary embodiment as those in the second or third exemplary embodiment are indicated by the same reference signs, and detailed description thereof is omitted herein.

<<Configuration of Demodulation Apparatus>>

Figure 13:
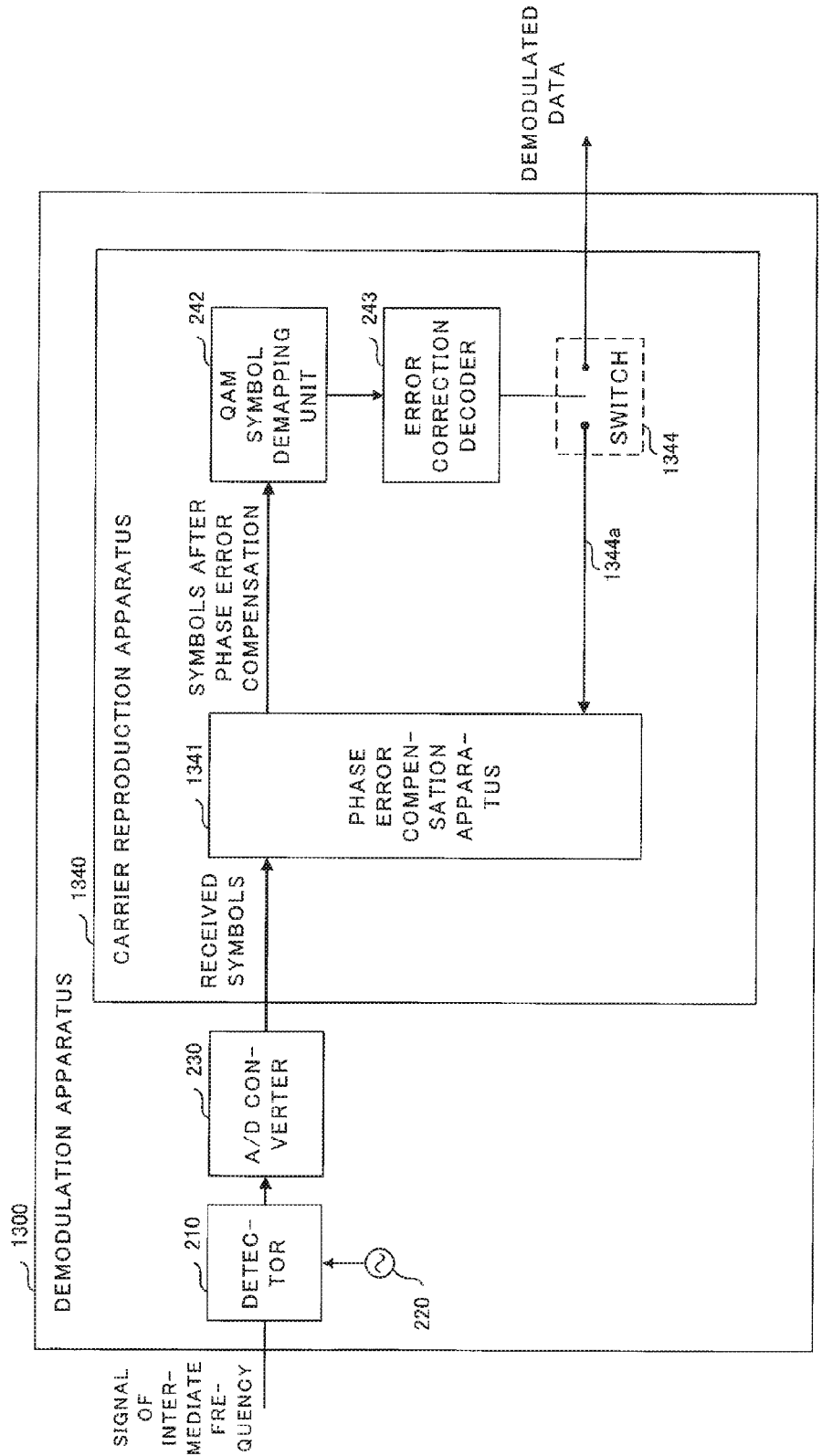
FIG. 13 is a block diagram illustrating a configuration of a demodulation apparatus including a phase error compensation apparatus in a fourth exemplary embodiment of the present invention.

FIG. 13 is a block diagram illustrating a configuration of a demodulation apparatus 1300 including a phase error compensation apparatus 1341 in the present exemplary embodiment. Note that a carrier reproduction apparatus 1340 including the phase error compensation apparatus 1341 is included in the demodulation apparatus 1300.

Symbols for phase reference, which is an input to the phase error compensation apparatus 1341, are indicated by a(1), a(2), . . . , a(M). In the present exemplary embodiment, it is assumed that transmitted symbols are not clear, estimated transmitted symbols after error correction to be obtained after performing an error correction process are usable, and the transmitted symbols coincide with the estimated transmitted symbols. The estimated transmitted symbols after error correction are input from the outside to the phase error compensation apparatus 1341.

On the other hand, demodulated data output from an error correction decoder 243 serves as an output of the demodulation apparatus 1300 or serves as input data 1344*a* to the phase error compensation apparatus 1341 by a switch 1344. When the number of times of performing phase error compensation in the phase error compensation apparatus 1341 reaches a predetermined specific number of times, or when it is determined that there is no error in the error correction decoder 243, an output of the error correction decoder 243 is output as demodulated data of the demodulation apparatus 1300. Otherwise, an output of the error correction decoder 243 is input to the phase error compensation apparatus 1341, and is used as symbols for phase reference in the phase error compensation apparatus 1341. By the aforementioned feedback, phase error in received symbols is repeatedly compensated, and precision of compensation is improved.

<<Configuration of Phase Error Compensation Apparatus>>

Figure 14:
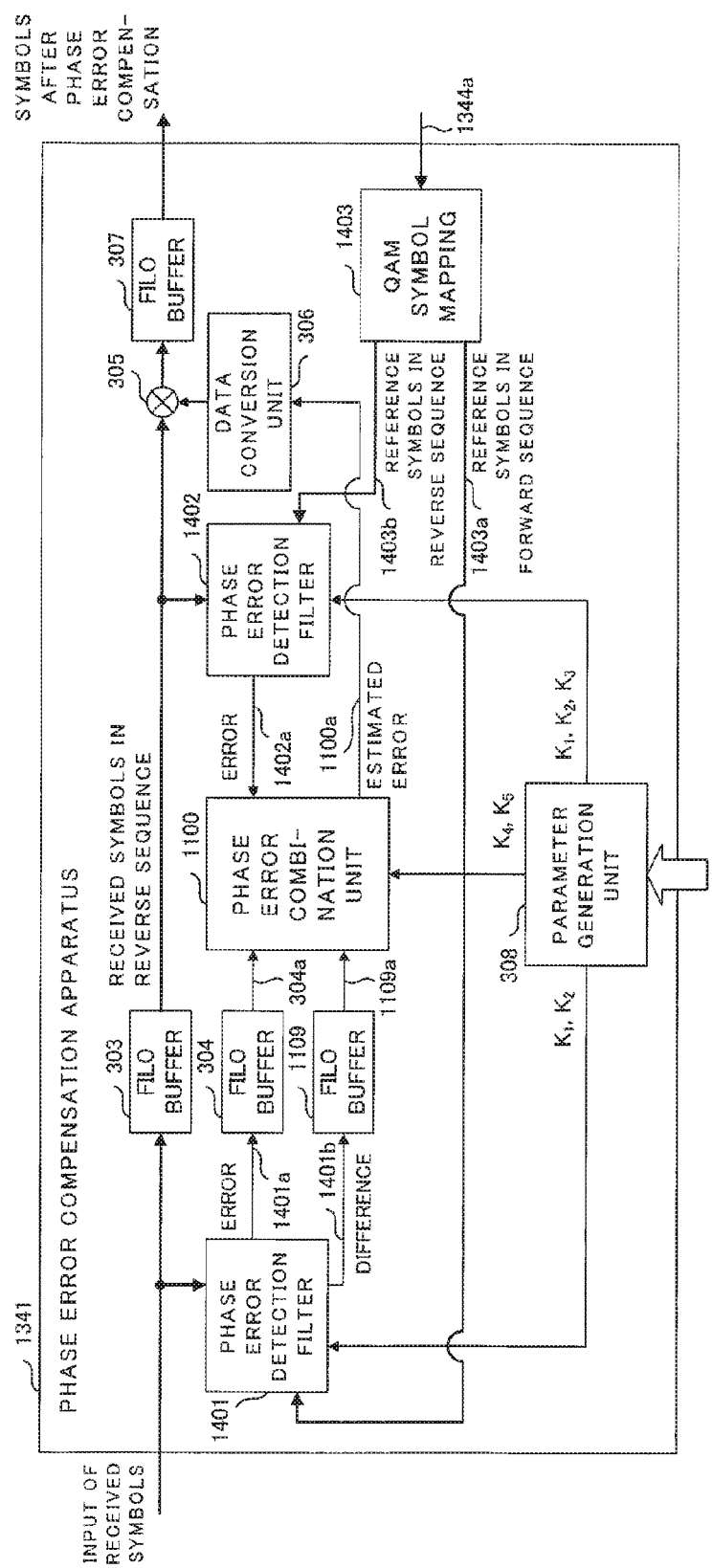
FIG. 14 is a block diagram illustrating a configuration of the phase error compensation apparatus in the fourth exemplary embodiment of the present invention.

FIG. 14 is a block diagram illustrating a configuration of the phase error compensation apparatus 1341 in the present exemplary embodiment. Note that the same functional configuration units in FIG. 14 as those in FIG. 3 or in FIG. 11 are indicated by the same reference signs, and description thereof is omitted herein.

Reference symbols 1403*a* in a forward sequence or reference symbols in a reverse sequence from a QAM symbol mapping unit 1403 are input to a phase error detection filter 1401 or 1402, and are used for generating a phase error estimation value and a phase difference value. The QAM symbol mapping unit 1403 generates the reference symbols 1403*a* in a forward sequence and reference symbols in a reverse sequence by mapping the input data 1344*a* from the error correction decoder 243 illustrated in FIG. 13, as QAM symbols.

Note that in the example illustrated in FIG. 14, as described in the third exemplary embodiment, it is configured such that a phase error combination unit 1100 uses a phase difference value generated on the basis of received symbols in a forward sequence. Alternatively, as described in the second exemplary embodiment, it may be configured such that a phase error combination unit 1100 uses a phase difference value generated on the basis of received symbols in a reverse sequence. Further, in the example illustrated in FIG. 14, the QAM symbol mapping unit 1403 is provided in the phase error compensation apparatus, but the QAM symbol mapping unit 1403 may be provided in a carrier reproduction apparatus on the outside of a phase error compensation circuit.

(Configuration of Phase Error Detection Filter)

Figure 15:
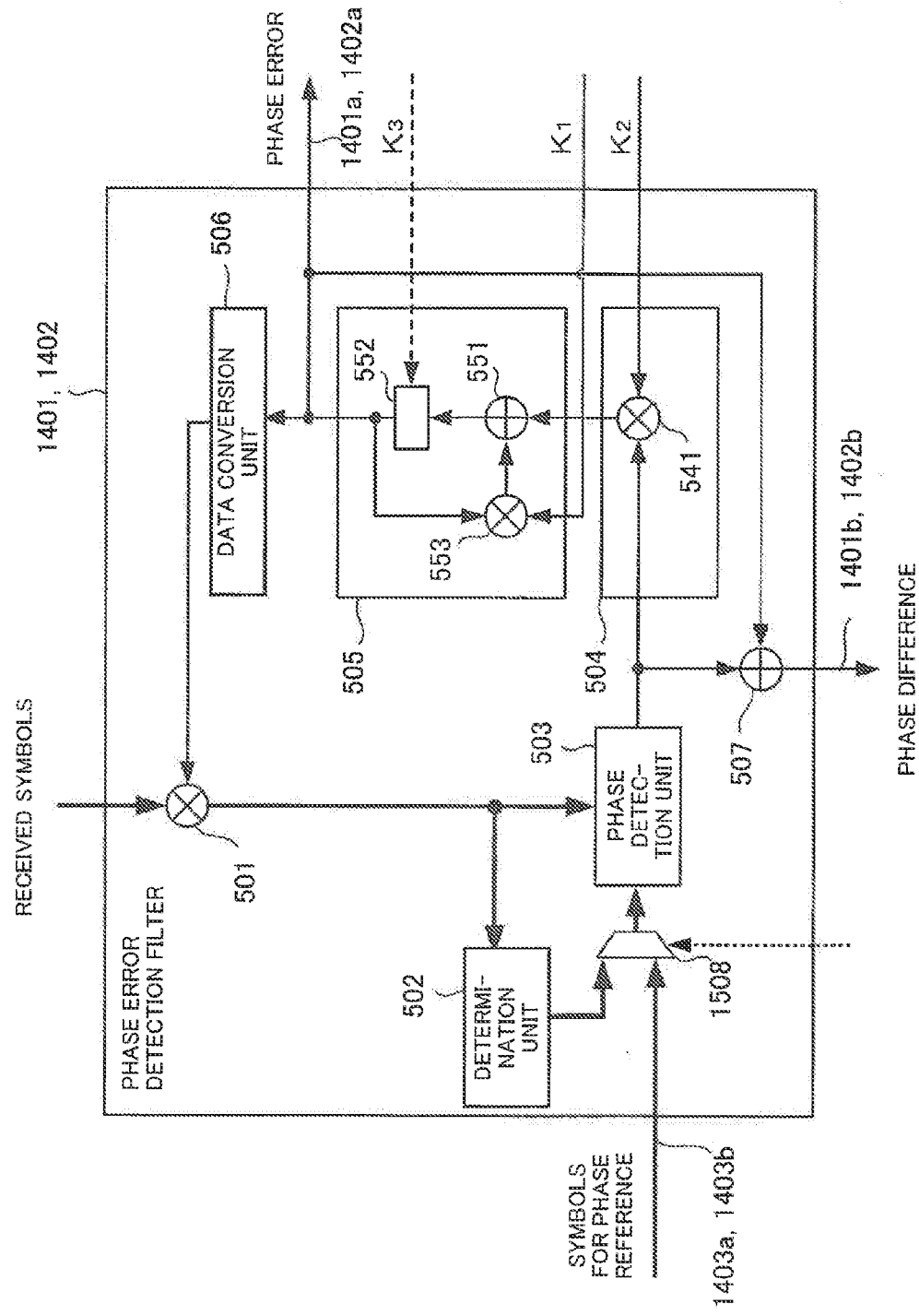
FIG. 15 is a block diagram illustrating a configuration of a phase error detection filter in the fourth exemplary embodiment of the present invention.

FIG. 15 is a block diagram illustrating a configuration of the phase error detection filters 1401 and 1402 in the present exemplary embodiment. Note that in FIG. 15, the same functional configuration units as those in FIG. 5 are indicated by the same reference signs, and description thereof is omitted herein.

A selector 1508 receives output symbols of a determination unit 502, and symbols for phase reference, which are one of input data to the phase error detection filter 1401 or 1402, as inputs, and selects and outputs one of the inputs. In the phase error compensation apparatus 1341 in the present exemplary embodiment, when there is an input of symbols for phase reference, the selector 1508 selects the symbols for phase reference. Therefore, an output of the determination unit 502 is not used. On the other hand, when symbols for phase reference are NULL, output symbols of the determination unit 502 are always selected.

In the present exemplary embodiment, not estimated transmitted symbols generated in a phase error detection filter, but estimated transmitted symbols generated on the basis of received symbols whose phase is compensated by the phase error compensation apparatus are used. Therefore, it is further possible to perform large-capacity and high-quality data communication with an improved bit error rate.

Fifth Exemplary Embodiment

Next, a phase error compensation apparatus in a fifth exemplary embodiment of the present invention is described. The phase error compensation apparatus in the present exemplary embodiment is different from the phase error compensation apparatuses in the second to fourth exemplary embodiments in a point that a process for compensating a phase error is not performed for initial symbols. The other configuration and operation in the fifth exemplary embodiment are the same as the configuration and operation in the second to fourth exemplary embodiments. Therefore, the same configuration and operation in the fifth exemplary embodiment as those in the second to fourth exemplary embodiments are indicated by the same reference signs, and detailed description thereof is omitted herein.

<<Configuration of Phase Error Compensation Apparatus>>

Figure 16:
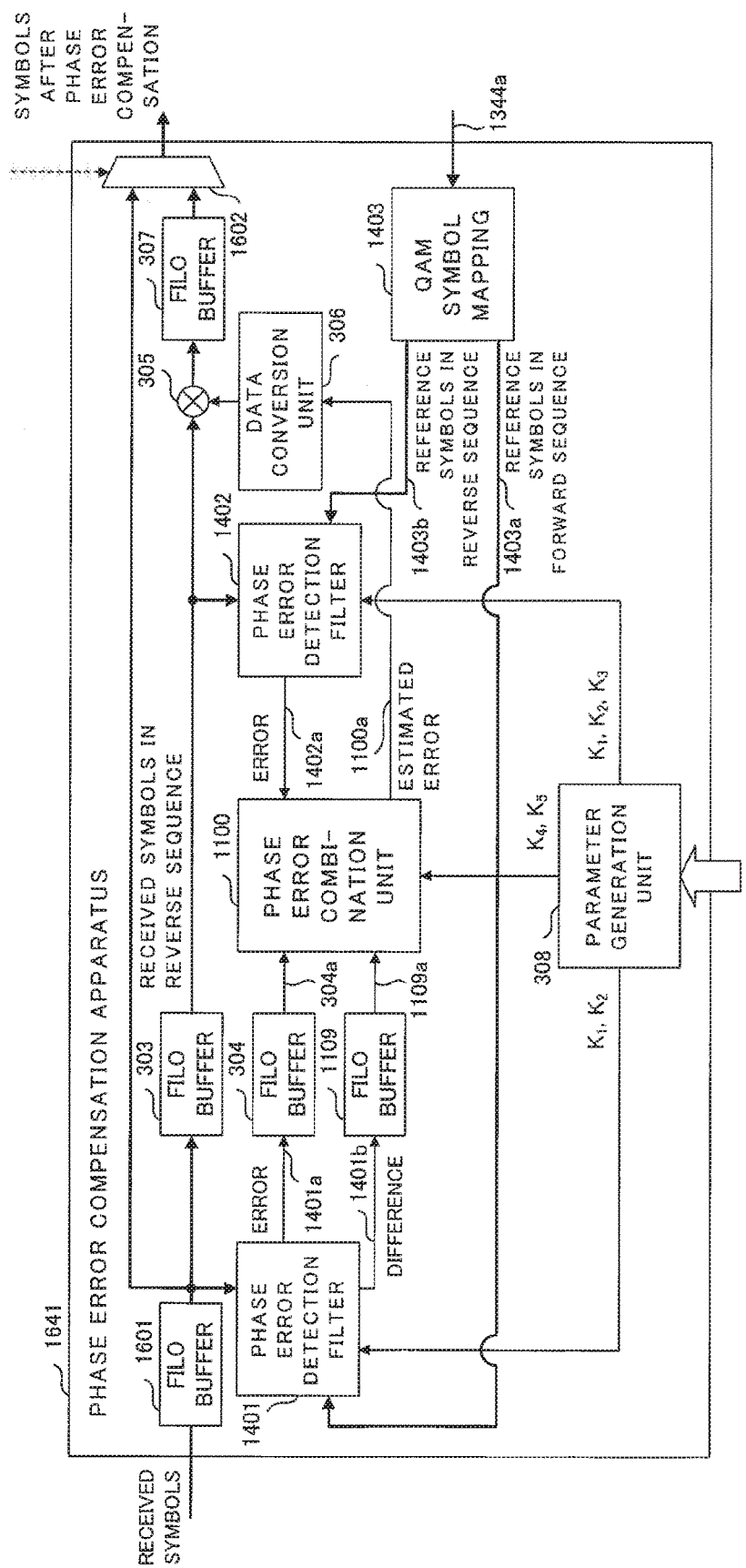
FIG. 16 is a block diagram illustrating a configuration of a phase error compensation apparatus in a fifth exemplary embodiment of the present invention.

FIG. 16 is a block diagram illustrating a configuration of a phase error compensation apparatus 1641 in the present exemplary embodiment. Note that in FIG. 16, the same functional configuration units as those in FIG. 3, FIG. 11, or FIG. 14 are indicated by the same reference signs, and description thereof is omitted herein. Note that in the example illustrated in FIG. 16, as described in the third exemplary embodiment, it is configured such that a phase error combination unit 1100 uses a phase difference value generated on the basis of received symbols in a forward sequence. Alternatively, as described in the second exemplary embodiment, it may be configured such that a phase error combination unit 1100 uses a phase difference value generated on the basis of received symbols in a reverse sequence. Further, the fourth exemplary embodiment illustrates that the phase error compensation apparatus may include the QAM symbol mapping unit 1403, and reference symbols 1403*a* in a forward sequence, and reference symbols 1403*b* in a reverse sequence may be used. Alternatively, as described in the second exemplary embodiment, a phase error detection filter may internally generate estimated transmitted symbols for reference.

The selector 1602 selects one of input received symbols whose phase error is compensated, and received symbols held in a buffer 1601, and inputs the selected symbols to the QAM symbol demapping unit. There are two selecting methods. One is a method, in which received symbols held in the buffer 1601 are selected only at the first time, and at the second time and thereafter, received symbols whose phase error is compensated are selected. The other is a method, in which received symbols whose phase error is compensated are always selected. A difference between the two methods is an output of received symbols whose phase error is compensated is selected or not at the first time. An output of received symbols whose phase error is compensated at the first time serves as symbols whose phase error is compensated without an input of symbols for phase reference. Specifically, a difference between the two selecting methods by the selector 1602 is whether or not an output of the selector 1602 is received symbols held in the buffer 1601, or is received symbols whose phase is compensated by the phase error compensation apparatus 1641 without symbols for phase reference.

Note that in the example illustrated in FIG. 16, the buffer 1601 and the selector 1602 are provided inside the phase error compensation apparatus 1641. Alternatively, the buffer 1601 and the selector 1602 may be provided in a carrier reproduction apparatus on the outside of the phase error compensation apparatus 1641.

According to the present exemplary embodiment, it is possible to prevent deterioration of a bit error rate caused by phase error compensation without an input of symbols for phase reference at the first time by selecting whether or not an output of received symbols whose phase error is compensated at the first time is selected.

Sixth Exemplary Embodiment

Next, a phase error compensation apparatus in a sixth exemplary embodiment of the present invention is described. The phase error compensation apparatus in the present exemplary embodiment is different from the phase error compensation apparatuses in the second to fifth exemplary embodiments in a point that phase error compensation in which a pilot signal is embedded in a transmitted signal is performed. The other configuration and operation in the sixth exemplary embodiment are the same as the configuration and operation in the second to fifth exemplary embodiments. Therefore, the same configuration and operation in the sixth exemplary embodiment as those in the second to fifth exemplary embodiments are indicated by the same reference signs, and detailed description thereof is omitted herein.

<<Configuration of Demodulation Apparatus>>

Figure 17:
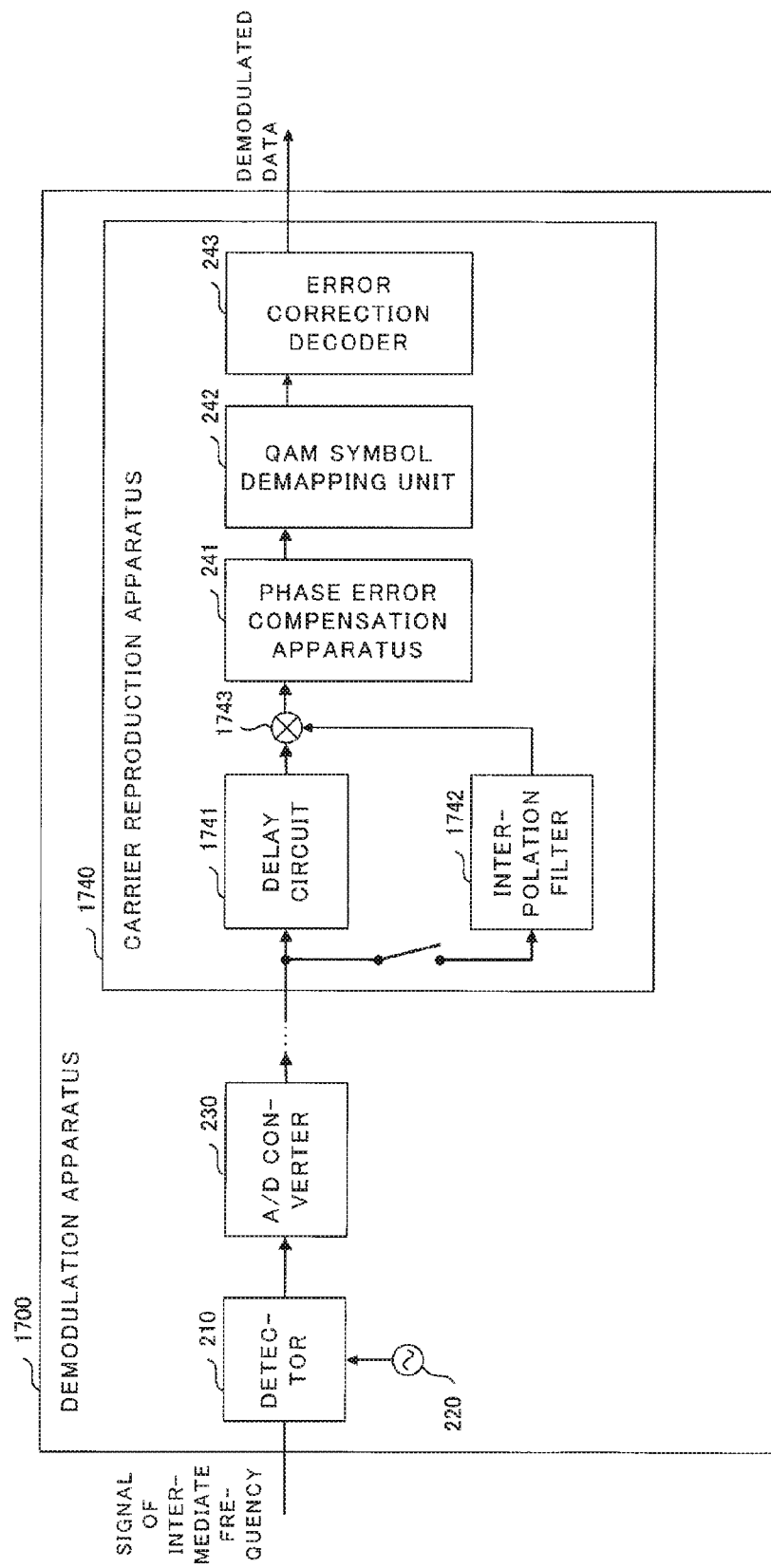
FIG. 17 is a block diagram illustrating a configuration of a demodulation apparatus in a sixth exemplary embodiment of the present invention.

FIG. 17 is a block diagram illustrating a configuration of a demodulation apparatus 1700 in the present exemplary embodiment. Note that in the example illustrated in FIG. 17, the same functional configuration units as those in FIG. 2B are indicated by the same reference signs, and description thereof is omitted herein.

The demodulation apparatus 1700 includes a carrier reproduction apparatus 1740. The carrier reproduction apparatus 1740 is provided with a delay circuit 1741, an interpolation filter 1742, and a phase rotator 1743. Then, in the example illustrated in FIG. 17, an output of the phase rotator 1743, which is a multiplier, is input to the phase error compensation apparatus 241 in the second exemplary embodiment, as received symbols. Note that the phase error compensation apparatus may have the same configuration as the configuration in the third to fifth exemplary embodiments.

The interpolation filter 1742 is used for estimating a phase error between received pilot symbols on the basis of the received pilot symbols associated with a pilot signal. Further, the delay circuit 1741 generates a delay equivalent to the number of symbols corresponding to an interpolation process of the interpolation filter 1742. Further, the phase rotator 1743 compensates an estimated phase error.

Received symbols associated with each of a digitized Ich baseband signal and a digitized Qch baseband signal are input to the delay circuit 1741. In this example, received symbols are also input to the interpolation filter 1742, as far as the received symbols are pilot symbols associated with a well-known pilot signal. The interpolation filter 1742 estimates, on the basis of a plurality of pilot symbols, a phase error in received symbols between the pilot symbols by an interpolation process. The phase rotator 1743 rotates a phase of received symbols, and compensates phase error in the received symbols on the basis of phase error information output by the interpolation filter 1742. Received symbols after phase error compensation, which are output by the interpolation filter 1742, are input to the phase error compensation apparatus in the present exemplary embodiment.

The carrier reproduction apparatus 1740 illustrated in FIG. 17 may be further provided with a tap coefficient generation unit which generates data to be used in a process for estimating a phase error in the interpolation filter 1742 from statistical information relating to phase noise and thermal noise, and supplies the generated data to the interpolation filter 1742.

In the present exemplary embodiment, the present phase error compensation apparatus is employed by a demodulation apparatus which compensates a phase error in which a pilot signal is embedded in a transmitted signal. Therefore, it is possible to perform large-capacity and high-quality data communication with an improved bit error rate even in an adverse noise environment mainly caused by phase noise or thermal noise.

Other Embodiments

In a noise parameter, when $f_p$ is extremely small as compared with $f_s$, and $\gamma$ expressed in Eq. (9) is extremely small as compared with a parameter $\sigma_w^2$ to be defined by a variance value of thermal noise, it is possible to approximate $K_1$, $K_2$, $K_3$, $K_4$, and $K_5$ designated by Eq. (11), Eq. (12), and Eq. (13) by an appropriate real number $\lambda$ close to 1 as expressed by Eq. (14).

Therefore, in Step S907 illustrated in FIG. 9, a parameter generation unit 308 sets the coefficients $K_1$ to $K_5$ according to Eq. (14).

[Math. 14]

$$K_1 = 1 - \lambda, K_2 = 1, K_3 = 1, K_4 = \frac{1}{2}, K_5 = \frac{1-\lambda}{2\lambda} \qquad (14)$$

The present invention may be applied to a system constituted by a plurality of apparatuses, or may be applied to a single apparatus. Further, the present invention may also be applicable to a case, in which an information processing program for implementing the functions of the exemplary embodiments is directly or remotely supplied to a system or an apparatus. Therefore, a program to be installed in a computer, a medium stored with the program, and a WWW (World Wide Web) server which causes a computer to download the program for the purpose of implementing the functions of the present invention by a computer are also included in the scope of the present invention. In particular, at least a non-transitory computer readable medium in which a program is stored to cause a computer to execute the processing steps included in the aforementioned exemplary embodiments is included in the scope of the present invention.

Other Explanation on Embodiments

The whole or part of the exemplary embodiments disclosed above can be described as, but not limited to, the following supplementary notes.

(Supplementary Note 1)

A phase error compensation apparatus comprising:

a first phase error detection filter which generates a first phase difference value and a first phase error estimation value on the basis of received symbols in a forward sequence;

a second phase error detection filter which generates a second phase difference value and a second phase error estimation value on the basis of the received symbols in a reverse sequence;

a phase error combination means which generates a third phase error estimation value on the basis of the first phase error estimation value and the second phase error estimation value, and one of the first phase difference value and the second phase difference value; and a phase error compensation means which compensates a phase error in the received symbols in association with the third phase error estimation value.

(Supplementary Note 2)

The phase error compensation apparatus according to Supplementary note 1, further comprising:

a parameter generation means which generates a coefficient to be used by the first phase error detection filter, the second phase error detection filter and the phase error combination means.

(Supplementary Note 3)

The phase error compensation apparatus according to Supplementary note 1 or 2, wherein the first phase error detection filter and the second phase error detection filter include:

a determination means which calculates transmitted symbols closest to received symbols whose phase is compensated;

a phase detection means which calculates a phase difference value between the calculated transmitted symbols and the received symbols whose phase is compensated;

a one-tap filter which removes a high frequency component included in an output of the phase detection means with use of a tap coefficient calculated on the basis of a phase noise parameter of a reference oscillator and a signal-to-noise ratio;

a cumulative adder means which calculates an estimated value of phase error generated in the received symbols caused by phase noise on the basis of an output of the one-tap filter, with use of a feedback coefficient calculated on the basis of the phase noise parameter of the reference oscillator and the signal-to-noise ratio;

a data conversion means which converts the estimated value of phase error into phase compensation data of received symbols; and a multiplier which compensates a phase of received symbols by an output of the data conversion means.

(Supplementary Note 4)

The phase error compensation apparatus according to Supplementary note 3, wherein the cumulative adder means in the second phase error detection filter further uses an initial coefficient for setting an initial value.

(Supplementary Note 5)

The phase error compensation apparatus according to Supplementary note 3 or 4, wherein the phase detection means in the first phase error detection filter and in the second phase error detection filter calculates a phase difference value between one of symbols selected from the transmitted symbols, and symbols for phase reference; and the received symbols whose phase is compensated, the symbols for phase reference being obtained by inverse conversion of demodulated data, the demodulated data being converted on the basis of received symbols whose phase error is compensated.

(Supplementary Note 6)

The phase error compensation apparatus according to any one of Supplementary notes 1 to 5, wherein the phase error combination means includes;

a first adder which adds the first phase error estimation value and the second phase error estimation value;

a second multiplier which multiplies a first multiplication coefficient calculated from a phase noise parameter of a reference oscillator and from a signal-to-noise ratio with an addition result of the adder;

a third multiplier which multiplies a second multiplication coefficient calculated from the phase noise parameter of the reference oscillator and from the signal-to-noise ratio with one of the first phase difference value and the second phase difference value; and a second adder which sets a result of addition of the multiplication result of the second multiplier and the multiplication result of the third multiplier, as the third phase error estimation value generated in a phase of received symbols caused by phase noise.

(Supplementary Note 7)

A carrier reproduction apparatus comprising:

the phase error compensation apparatus of any one of Supplementary notes 1 to 5;

a symbol demapping means which demaps received symbols whose phase error is compensated by the phase error compensation apparatus; and an error correction decoding means which corrects an error included in the received symbols whose phase error is compensated on the basis of an output of the symbol demapping means, and outputs demodulated data.

(Supplementary Note 8)

A demodulation apparatus comprising:

the carrier reproduction apparatus of Supplementary note 7;

a reference oscillator which outputs a reference signal of a fixed frequency;

a detector which orthogonally detects an input signal of an intermediate frequency, and generates an Ich baseband signal and a Qch baseband signal; and an analog-to-digital converter which converts a generated baseband signal into a digital signal, and inputs the digital signal to the carrier reproduction apparatus as the received symbols.

(Supplementary Note 9)

A communication apparatus comprising:

at least the demodulation apparatus of Supplementary note 8;

a receiving circuit which selects a radio wave of a predetermined frequency band from radio waves to be received by an antenna to convert the selected radio wave into a signal of an intermediate frequency, and inputs the converted signal to the demodulation apparatus; and a received data decoding means which decodes demodulated data input by the demodulation apparatus, and generates received data.

(Supplementary Note 10)

A phase error compensation method comprising:

generating a sequence of phase difference values $\varphi(1)$, $\varphi(2), \ldots, \varphi(M)$ (where M is a positive integer) between a sequence of received symbols and a sequence of reference symbols;

successively calculating first phase error estimation values $\theta^+(1), \theta^+(2), \ldots, \theta^+(M), \theta^+(M+1)$ caused by phase noise included in the sequence of phase difference values on the basis of the sequence of phase difference values;

successively calculating second phase error estimation values $\theta^-(M), \theta^-(M-1), \ldots, \theta^-(1)$ on the basis of the sequence of phase difference values $\varphi(M), \varphi(M-1), \ldots, \varphi(1)$ by setting $\theta^+(M+1)$ as an initial value;

calculating third phase error estimation values $\theta^\pm(1), \theta^\pm(2), \ldots, \theta^\pm(M)$ by linear computation of the first phase error estimation values $\theta^+(1), \theta^+(2), \ldots, \theta^+(M)$, the second phase error estimation values $\theta^-(1), \theta^-(2), \ldots, \theta^-(M)$, and the phase difference values $\varphi(1), \varphi(2), \ldots, \varphi(M)$;

successively calculating the first phase error estimation values, the second phase error estimation values, and the third phase error estimation values included in phase difference values $\varphi(kM+1), \varphi(kM+2), \ldots, \varphi((k+1)M)$ regarding a positive integer k by the calculation processes; and compensating a phase error by subtracting the third phase error estimation values $\theta^\pm(kM+1), \theta^\pm(kM+2), \ldots, \theta^\pm((k+1)M)$ from the phase difference values $\varphi(kM+1), \varphi(kM+2), \ldots, \varphi((k+1)M)$.

(Supplementary Note 11)

A storage medium stored with a phase error compensation program which causes a computer to execute the processes of:

generating a sequence of phase difference values $\varphi(1), \varphi(2), \ldots, \varphi(M)$ (where M is a positive integer) between a sequence of received symbols and a sequence of reference symbols;

successively calculating first phase error estimation values $\theta^+(1), \theta^+(2), \ldots, \theta^+(M), \theta^+(M+1)$ caused by phase noise included in the sequence of phase difference values on the basis of the sequence of phase difference values;

successively calculating second phase error estimation values $\theta^-(M), \theta^-(M-1), \ldots, \theta^-(1)$ on the basis of the sequence of phase difference values $\varphi(M), \varphi(M-1), \ldots, \varphi(1)$ by setting $\theta^+(M+1)$ as an initial value;

calculating third phase error estimation values $\theta^\pm(1), \theta^\pm(2), \ldots, \theta^\pm(M)$ by linear computation of the first phase error estimation values $\theta^+(1), \theta^+(2), \ldots, \theta^+(M)$, the second phase error estimation values $\theta^-(1), \theta^-(2), \ldots, \theta^-(M)$, and the phase difference values $\varphi(1), \varphi(2), \ldots, \varphi(M)$;

successively calculating the first phase error estimation values, the second phase error estimation values, and the third phase error estimation values included in phase difference values $\varphi(kM+1), \varphi(kM+2), \ldots, \varphi((k+1)M)$ regarding a positive integer k by the calculation processes; and compensating a phase error by subtracting the third phase error estimation values $\theta^\pm(kM+1), \theta^\pm(kM+2), \ldots, \theta^\pm((k+1)M)$ from the phase difference values $\varphi(kM+1), \varphi(kM+2), \ldots, \varphi((k+1)M)$.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. Further, a system or an apparatus obtained by combining individual features included in each of the exemplary embodiments in any way may be also included in the scope of the present invention. As an application example of the present invention, general digital wireless communication apparatuses including a mobile terminal apparatus and a backbone wireless apparatus are suitable.

This application is based upon and claims the benefit of priority from Japanese patent application No. 2014-006180, filed on Jan. 16, 2014, the disclosure of which is incorporated herein in its entirety by reference.

The invention claimed is:

1. A phase error compensation apparatus comprising:
a first phase error detection filter which generates a first phase difference value and a first phase error estimation value on the basis of received symbols in a forward sequence;
a second phase error detection filter which generates a second phase difference value and a second phase error estimation value on the basis of the received symbols in a reverse sequence;
a phase error combiner which generates a third phase error estimation value on the basis of the first phase error estimation value and the second phase error estimation value, and one of the first phase difference value and the second phase difference value; and
a phase error compensator which compensates a phase error in the received symbols in association with the third phase error estimation value.

2. The phase error compensation apparatus according to claim 1, further comprising:
a parameter generator which generates a coefficient to be used by the first phase error detection filter, the second phase error detection filter and the phase error combiner.

3. The phase error compensation apparatus according to claim 1, wherein
the first phase error detection filter and the second phase error detection filter include:
a determinator which calculates transmitted symbols closest to received symbols whose phase is compensated;
a phase detector which calculates a phase difference value between the calculated transmitted symbols and the received symbols whose phase is compensated;
a one-tap filter which removes a high frequency component included in an output of the phase detector with use of a tap coefficient calculated on the basis of a phase noise parameter of a reference oscillator and a signal-to-noise ratio;
a cumulative adder which calculates an estimated value of phase error generated in the received symbols caused by phase noise on the basis of an output of the one-tap filter, with use of a feedback coefficient calculated on the basis of the phase noise parameter of the reference oscillator and the signal-to-noise ratio;
a data converter which converts the estimated value of phase error into phase compensation data of received symbols; and
a multiplier which compensates a phase of received symbols by an output of the data converter.

4. The phase error compensation apparatus according to claim 3, wherein
the phase detector in the first phase error detection filter and in the second phase error detection filter calculates a phase difference value between one of symbols selected from the transmitted symbols, and symbols for phase reference; and the received symbols whose phase is compensated, the symbols for phase reference being obtained by inverse conversion of demodulated data, the demodulated data being converted on the basis of received symbols whose phase error is compensated.

5. The phase error compensation apparatus according to claim 1, wherein
the phase error combiner includes;
a first adder which adds the first phase error estimation value and the second phase error estimation value;
a second multiplier which multiplies a first multiplication coefficient calculated from a phase noise parameter of a reference oscillator and from a signal-to-noise ratio with an addition result of the adder;
a third multiplier which multiplies a second multiplication coefficient calculated from the phase noise parameter of the reference oscillator and from the signal-to-noise ratio with one of the first phase difference value and the second phase difference value; and
a second adder which sets a result of addition of the multiplication result of the second multiplier and the multiplication result of the third multiplier, as the third phase error estimation value generated in a phase of received symbols caused by phase noise.

6. A carrier reproduction apparatus comprising:
a phase error compensation apparatus including;
a first phase error detection filter which generates a first phase difference value and a first phase error estimation value on the basis of received symbols in a forward sequence;
a second phase error detection filter which generates a second phase difference value and a second phase error estimation value on the basis of the received symbols in a reverse sequence;
a phase error combiner which generates a third phase error estimation value on the basis of the first phase error estimation value and the second phase error estimation value, and one of the first phase difference value and the second phase difference value; and
a phase error compensator which compensates a phase error in the received symbols in association with the third phase error estimation value;

a symbol demapper which demaps received symbols whose phase error is compensated by the phase error compensation apparatus; and
an error correction decoder which corrects an error included in the received symbols whose phase error is compensated on the basis of an output of the symbol demapper, and outputs demodulated data.

7. A phase error compensation method comprising:
generating a sequence of phase difference values $\varphi(1)$, $\varphi(2), \ldots, \varphi(M)$ (where M is a positive integer) between a sequence of received symbols and a sequence of reference symbols;
successively calculating first phase error estimation values $\theta^+(1), \theta^+(2), \ldots, \theta^+(M), \theta^+(M+1)$ caused by phase noise included in the sequence of phase difference values on the basis of the sequence of phase difference values;
successively calculating second phase error estimation values $\varphi^-(M), \theta^-(M-1), \ldots, \theta^-(1)$ on the basis of the sequence of phase difference values $\varphi(M)$, $\varphi(M-1), \ldots, \varphi(1)$ by setting $\theta^+(M+1)$ as an initial value;
calculating third phase error estimation values $\theta^\pm(1)$, $\theta^\pm(2), \ldots, \theta^\pm(M)$ by linear computation of the first phase error estimation values $\theta^+(1), \theta^+(2), \ldots, \theta^+(M)$, the second phase error estimation values $\theta^-(1)$, $\theta^-(2), \ldots, \theta^-(M)$, and the phase difference values $\varphi(1)$, $\varphi(2), \ldots, \varphi(M)$;
successively calculating the first phase error estimation values, the second phase error estimation values, and the third phase error estimation values included in phase difference values $\varphi(kM+1)$, $\varphi(kM+2), \ldots$, $\varphi((k+1)M)$ regarding a positive integer k by the calculation processes; and
compensating a phase error by subtracting the third phase error estimation values $\theta^\pm(kM+1), \theta^\pm(kM+2), \ldots$, $\theta^\pm((k+1)M)$ from the phase difference values $\varphi(kM+1)$, $\varphi(kM+2), \ldots, \varphi((k+1)M)$.

* * * * *